(12) United States Patent
DeGroot et al.

(10) Patent No.: US 11,827,454 B2
(45) Date of Patent: Nov. 28, 2023

(54) HYGIENIC HOLLOW FRAME ASSEMBLY

(71) Applicant: Laitram, L.L.C., Harahan, LA (US)

(72) Inventors: Michael Hendrik DeGroot, Rockford, MI (US); Jeff Batchelder, Hesperia, MI (US); Gerko Hulshof, Aalten (NL); David A. Kokx, Hart, MI (US); James R. Honeycutt, Jr., Grandville, MI (US)

(73) Assignee: Laitram, L.L.C., Harahan, LA (US)

( * ) Notice: Subject to any disclaimer, the term of this patent is extended or adjusted under 35 U.S.C. 154(b) by 110 days.

(21) Appl. No.: 17/513,140

(22) Filed: Oct. 28, 2021

(65) Prior Publication Data

US 2022/0048713 A1 Feb. 17, 2022

Related U.S. Application Data

(63) Continuation of application No. 16/769,855, filed as application No. PCT/US2018/065178 on Dec. 12, 2018, now Pat. No. 11,192,723.

(Continued)

(51) Int. Cl.
*B65G 45/16* (2006.01)
*B65G 21/06* (2006.01)
(Continued)

(52) U.S. Cl.
CPC ............. *B65G 21/06* (2013.01); *B65G 15/60* (2013.01); *B65G 39/12* (2013.01); *B65G 45/00* (2013.01);
(Continued)

(58) Field of Classification Search
CPC ........ B65G 16/60; B65G 21/06; B65G 39/12; B65G 45/00; B65G 45/16; B65G 2203/042; B65G 2207/26
(Continued)

(56) References Cited

U.S. PATENT DOCUMENTS 3,631,968 A * 1/1972 Ward .................... B65G 45/16
198/497
4,570,983 A 2/1986 Olenfalk et al.
(Continued)

FOREIGN PATENT DOCUMENTS

EP 3021101 A1 5/2016
GB 2376744 12/2002
(Continued)

OTHER PUBLICATIONS

Notice of Reasons for Refusal, Japanese Patent Application No. 2020-531158; dated Feb. 28, 2023, Japan Patent Office.

*Primary Examiner* — Douglas A Hess
(74) *Attorney, Agent, or Firm* — Catherine M. Bishop

(57) ABSTRACT

A cleanable conveyor frame and a method for making a cleanable frame having a simplified frame design. Infeed and outfeed assemblies are movable between operating and cleaning positions. An outfeed assembly includes a drive for a conveyor belt and a position limiter-scraper assembly. The position limiter-scraper assembly comprises a roller extending between two connecting plates mounted to outfeed mounting plates, a scraper assembly having a scraper blade mounted to a mounting bar extending between the two connecting plates and a leaf spring extending rearward from the mounting bar for biasing the scraper blade into contact with the conveyor belt.

19 Claims, 29 Drawing Sheets

Related U.S. Application Data

(60) Provisional application No. 62/597,991, filed on Dec. 13, 2017.

(51) Int. Cl.
*B65G 15/60* (2006.01)
*B65G 39/12* (2006.01)
*B65G 45/00* (2006.01)

(52) U.S. Cl.
CPC .... *B65G 2203/042* (2013.01); *B65G 2207/26* (2013.01)

(58) Field of Classification Search
USPC ......................................... 198/497, 498, 499
See application file for complete search history.

(56) References Cited

U.S. PATENT DOCUMENTS

| | | | |
|---|---|---|---|
| 4,633,999 A * | 1/1987 | Perneczky | B65G 45/16 15/256.5 |
| 4,747,299 A | 5/1988 | Fox et al. | |
| 4,901,558 A | 2/1990 | Leining et al. | |
| 4,958,719 A * | 9/1990 | Hourticolon | B65G 45/16 198/635 |
| 5,117,677 A | 6/1992 | Hendershot et al. | |
| 5,213,197 A * | 5/1993 | Mohri | B65G 45/16 198/499 |
| 5,235,845 A | 8/1993 | Ito et al. | |
| 5,339,947 A * | 8/1994 | Campanile | B65G 45/16 15/256.6 |
| 5,344,000 A * | 9/1994 | Gleason | B65G 45/12 198/497 |
| 5,398,543 A | 3/1995 | Fukushima et al. | |
| 5,526,678 A | 6/1996 | Shaw et al. | |
| 5,542,835 A | 8/1996 | Kennedy et al. | |
| 5,713,610 A | 2/1998 | Eneim et al. | |
| 5,826,296 A * | 10/1998 | Steven | B05C 1/0817 100/174 |
| 5,931,280 A | 8/1999 | Nissen | |
| 6,171,025 B1 | 1/2001 | Langner et al. | |
| 6,193,052 B1 | 2/2001 | Cloud et al. | |
| 6,283,274 B1 * | 9/2001 | Dolan | B65G 45/16 15/256.5 |
| 6,401,911 B1 * | 6/2002 | Swinderman | B65G 45/12 198/499 |
| 7,086,132 B2 | 8/2006 | Choi et al. | |
| 7,513,141 B2 | 4/2009 | Rietzel | |
| 7,707,870 B2 | 5/2010 | Bustamante | |
| 8,061,508 B2 * | 11/2011 | Metzner | B65G 45/12 198/497 |
| 8,205,741 B2 * | 6/2012 | Swinderman | B65G 45/16 198/571 |
| 8,234,911 B2 | 8/2012 | Jax | |
| 8,276,736 B2 | 10/2012 | Steele | |
| 9,126,220 B2 | 9/2015 | Borner | |
| 9,395,263 B2 | 7/2016 | Wang | |
| 9,840,374 B2 * | 12/2017 | Ma | B65G 45/16 |
| 9,873,568 B2 | 1/2018 | Wolters et al. | |
| 10,077,156 B2 * | 9/2018 | Fourney | B65G 21/105 |
| 10,696,481 B2 * | 6/2020 | Batchelder | B65G 15/62 |
| 10,836,581 B2 * | 11/2020 | DeGroot | B65G 21/06 |
| 11,225,383 B2 * | 1/2022 | Schwarze | B65G 45/16 |
| 11,318,366 B2 * | 5/2022 | Lindeman | B08B 1/04 |
| 11,420,827 B2 * | 8/2022 | Weimann | B65G 45/16 |
| 2005/0166666 A1 | 8/2005 | Tsukagoshi | |
| 2016/0258833 A1 | 9/2016 | Haehnel | |
| 2018/0217020 A1 | 8/2018 | Hashimoto et al. | |

FOREIGN PATENT DOCUMENTS

| | | |
|---|---|---|
| JP | 56-132223 A | 10/1981 |
| JP | 2002338058 A | 11/2002 |
| JP | 2005060005 | 3/2005 |
| JP | 2006-225078 A | 8/2006 |
| WO | 2019118579 A2 | 6/2019 |

* cited by examiner

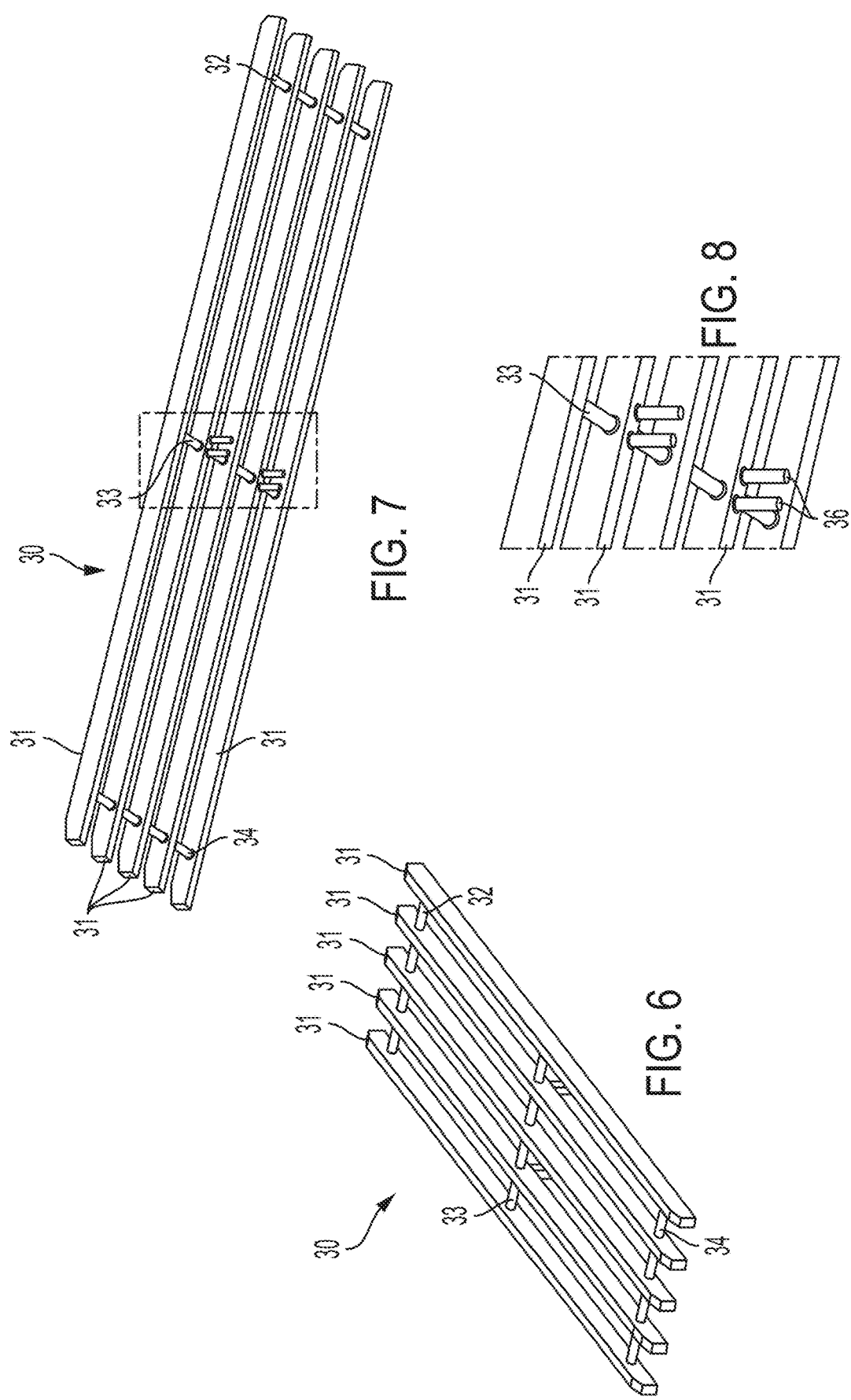

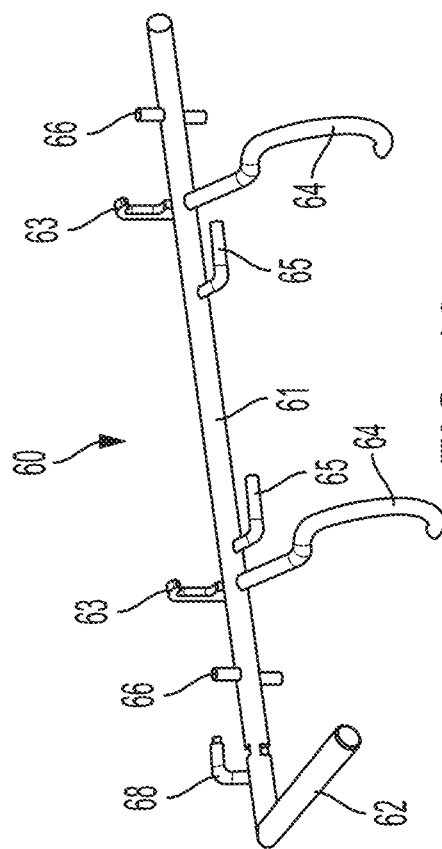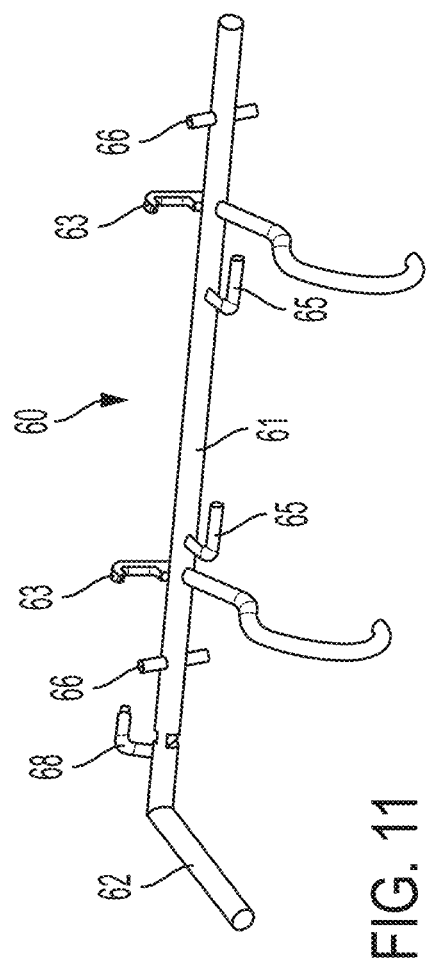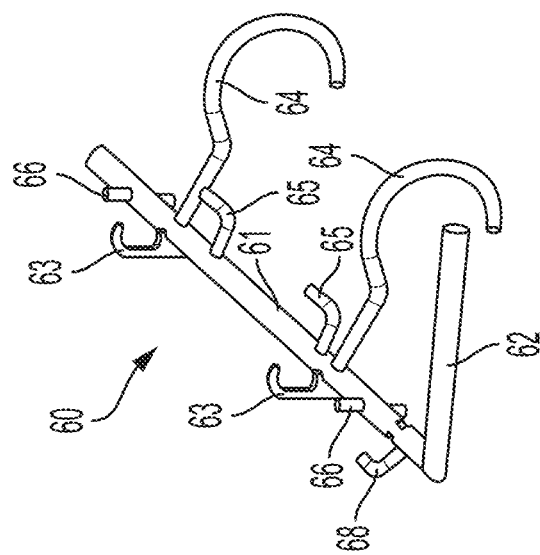

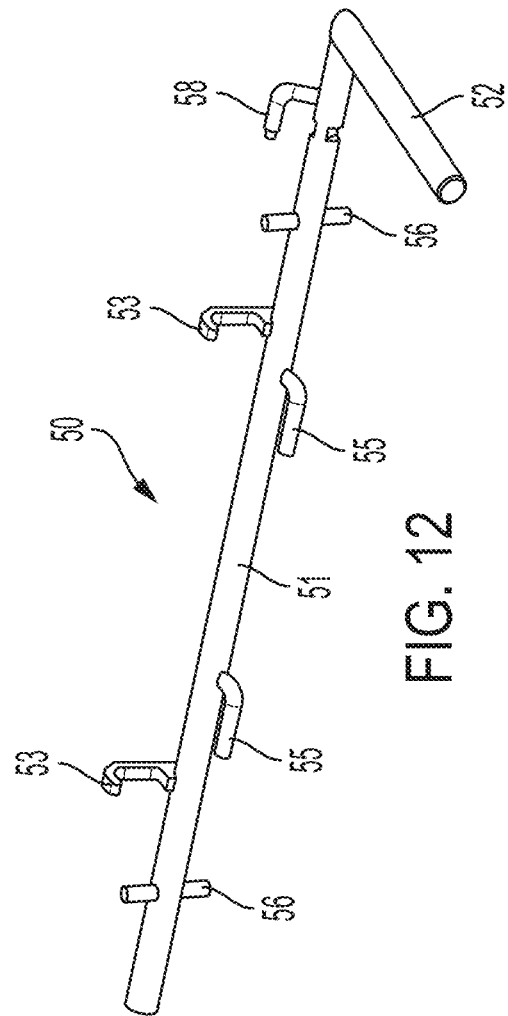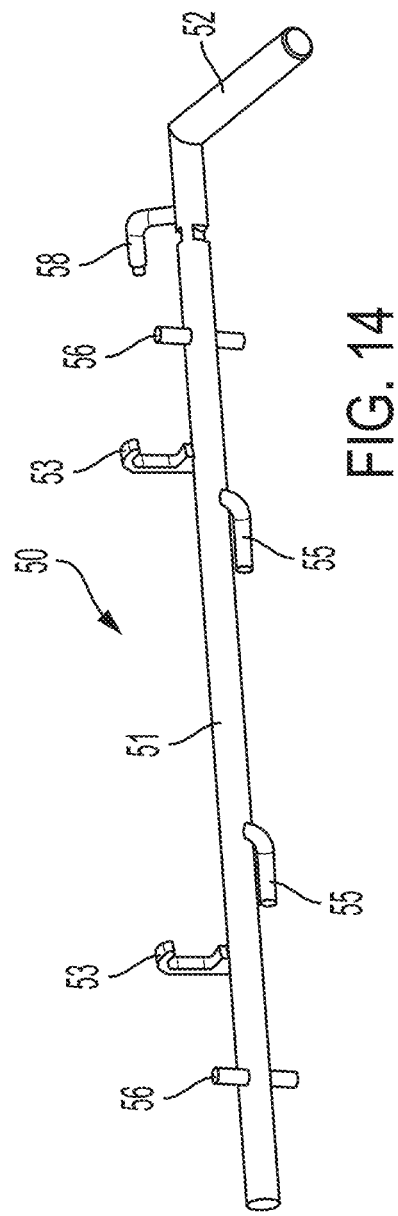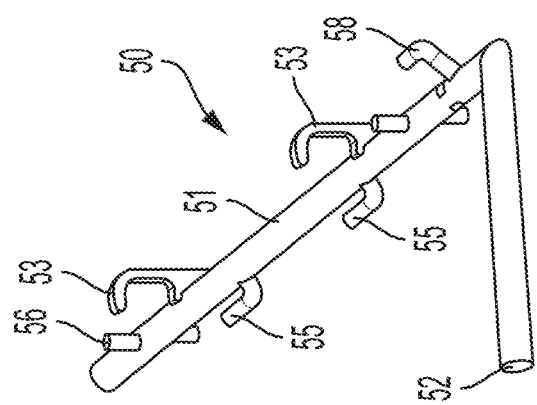

DETAIL C

DETAIL B

DETAIL A

DETAIL B

DETAIL A

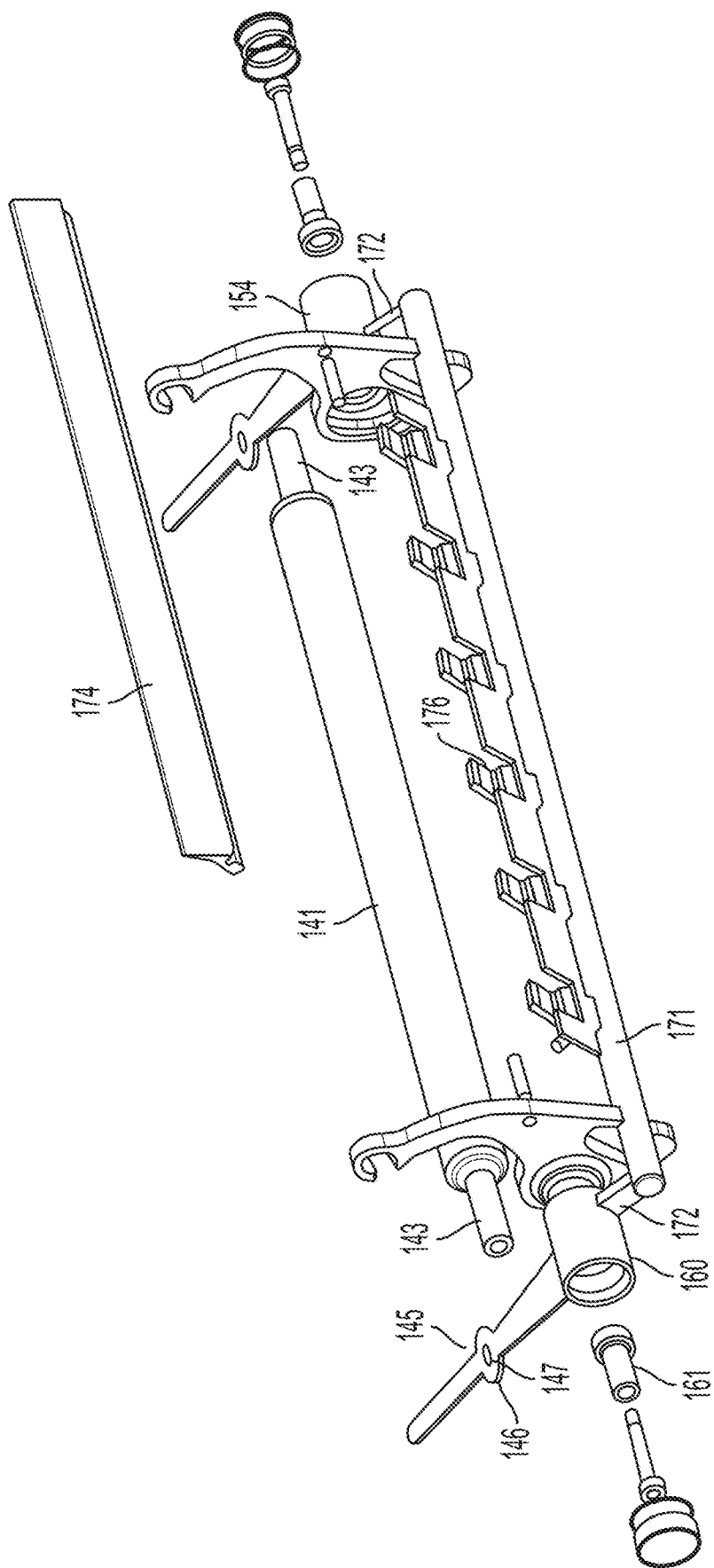

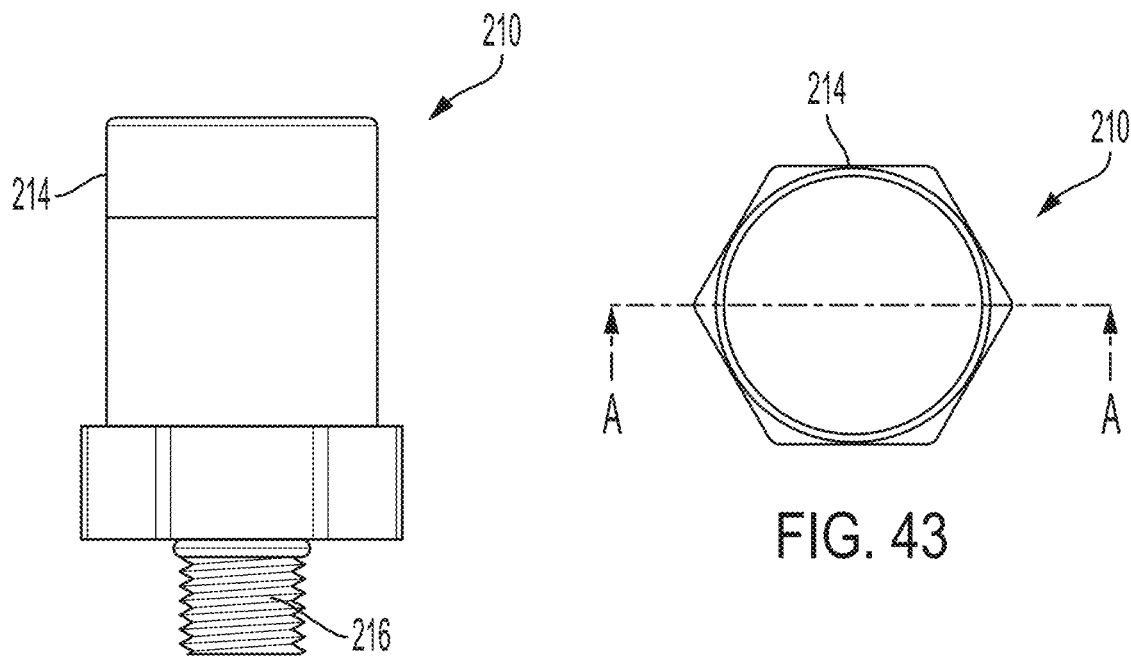
FIG. 42
FIG. 43
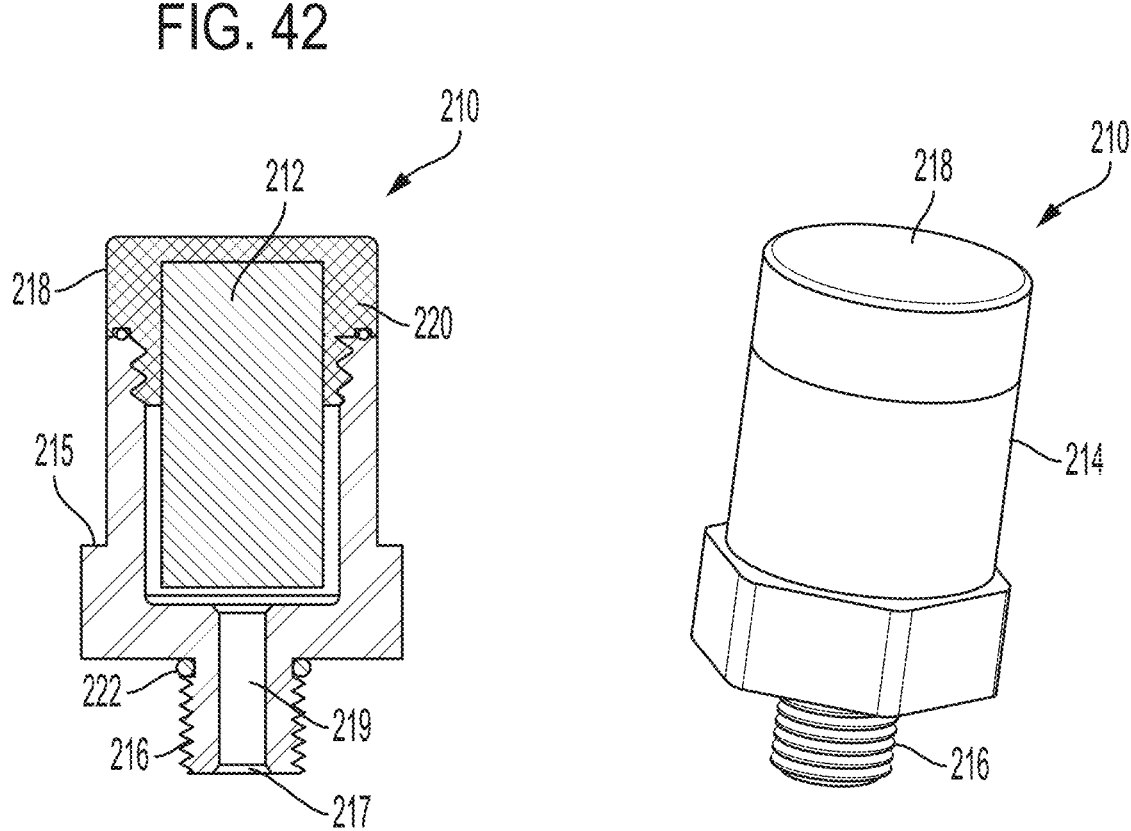
FIG. 44
FIG. 45

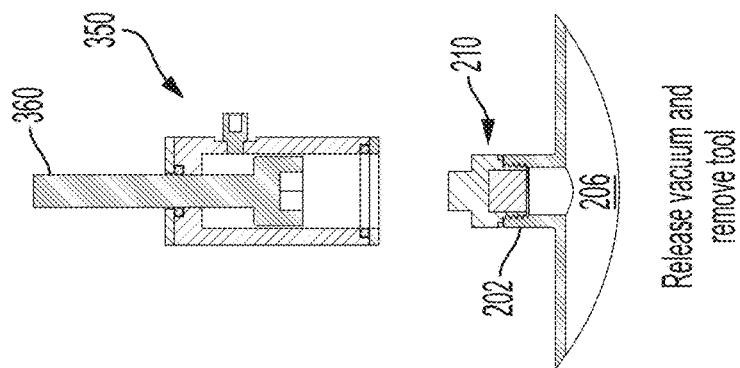
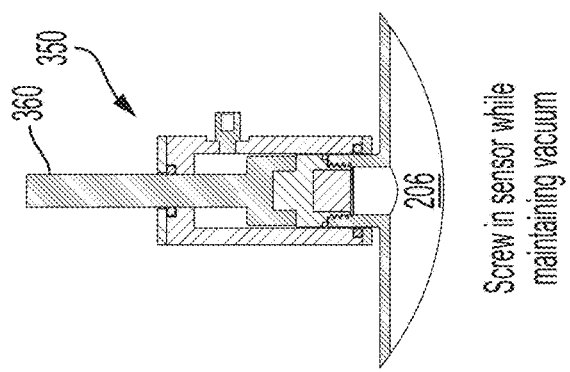
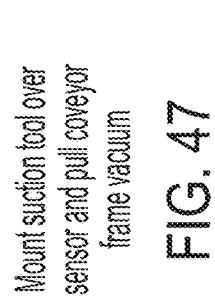
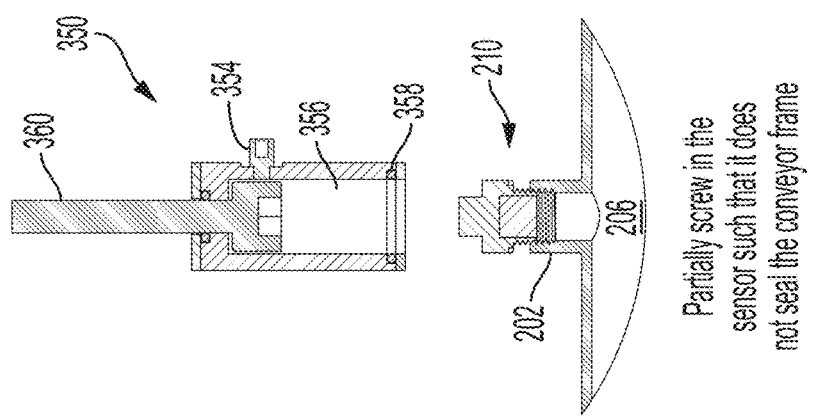
FIG. 46 — Partially screw in the sensor such that it does not seal the conveyor frame
FIG. 47 — Mount suction tool over sensor and pull conveyor frame vacuum
FIG. 48 — Screw in sensor while maintaining vacuum
FIG. 49 — Release vacuum and remove tool

HYGIENIC HOLLOW FRAME ASSEMBLY

RELATED APPLICATIONS

The present application is a continuation of U.S. patent application Ser. No. 16/769,855 filed on Jun. 4, 2020, entitled Hygienic Hollow Frame Assembly, the contents of which are herein incorporated by reference. U.S. patent application Ser. No. 16/769,855 is a 371 of PCT/US2018/065178, which claims benefit of U.S. Provisional Application 62/597,991, filed Dec. 13, 2017, the contents of which are herein incorporated by reference.

BACKGROUND

The invention relates generally to frames formed of sealed hollow tubes. An application of the invention is frames for power-driven conveyors and more particularly to belt conveyor frames that are easy to clean and monitor for pathogens.

In food processing industries, such as meat, poultry, fruit, vegetable, dairy, and snacks, conveyor belts are used to transport food products. Most conveyor belts are supported along carryways and returnways that are, in turn, supported by a conveyor frame structure. To meet USDA sanitation requirements, conveyor belt systems, comprised of the belt, frame structure and related conveyor components, must be cleanable.

In order to make the conveyor belt system cleanable, care must be taken to eliminate potential bacteria harborage zones. It is well known in food industries that potential bacteria harborage zones include hollow areas that are not hermetically sealed, non-sealed interfacing components (known as sandwiches), and threads. For this reason, there has been a strong movement toward designs that eliminate threaded components, sandwiches, and especially all hollow components. Hollow components are undesirable because it has not been possible to verify that hollow components remain hermetically sealed after installation. Further, sandwiches are often caused when there is a need to utilize different materials, for example, stainless steel and UHMWPE, that are not readily able to be sealed at their interfacing locations. As a result, the materials are often sandwiched together, providing a harborage zone for bacteria.

Many conveyors are constructed of laser cut and formed stainless steel sheet metal. To obtain an adequate stiffness, many bends and welds are required, thereby increasing the surface area requiring to be cleaned and the angle from which cleaning can occur. The cost of building and cleaning such conveyor frame structures is high. Likewise, the conveyor frame structure is not as stiff as when made from stainless steel hollow tubing, which can increase vibration and noise.

Thus, there is a need to establish assurance that a hollow component is not a potential harborage zone and to establish conveyor designs that optimize the interface where dissimilar materials mate for optimized function and ease of cleaning.

SUMMARY

This need and other needs are addressed by a conveyor system embodying features of the invention. A hygienic conveyor frame assembly comprises a plurality of hollow tubular sections joined together to form an evacuated, sealed conveyor frame support structure. An integral carryway is placed on the support structure. Lifters coupled to the conveyor frame can lift both the carryway and conveyor belt for cleaning. Infeed and outfeed assemblies are also movable between operating and cleaning positions. A sensor can monitor the internal conditions of each hollow section or component to ensure that the vacuum is maintained and initiate a corrective action if the vacuum seal is breached. Further, the sensor can monitor the internal conditions of each hollow component to ensure that the conditions are not suitable living conditions for bacteria.

According to one aspect, a scraper assembly for a conveyor belt comprises a pair of opposing connecting plates for pivotally mounting the scraper assembly to mounting plates at an outfeed end of the conveyor belt, a scraper mounting bar extending between the pair of opposing connecting plates, a scraper blade mounted to the scraper mounting bar and a first leaf spring connected to and extending rearward from the mounting bar. The leaf spring biases the scraper blade into contact with the conveyor belt.

According to another aspect, a drive head for a positively driven conveyor belt, comprises a pair of opposing mounting plates, a drive sprocket mounted between the mounting plates and a position limiter-scraper assembly comprising a roller extending between two connecting plates mounted to the mounting plates, a scraper assembly having a scraper blade mounted to a mounting bar extending between the two connecting plates and a leaf spring extending rearward from the mounting bar for biasing the scraper blade into contact with the conveyor belt.

According to another aspect, a conveyor frame comprises a support structure for a carryway, the support structure extending longitudinally from an infeed end to an outfeed end, a carryway on top of the support structure, the carryway comprising a plurality of longitudinal sections extending from the infeed end to the outfeed end, a set of infeed mounting plates at the infeed end, a set of outfeed mounting plates at the outfeed end, a drive mounted between the outfeed mounting plates and a position limiter-scraper assembly. The position limiter-scraper assembly comprises a roller extending between two connecting plates mounted to the outfeed mounting plates, a scraper assembly having a scraper blade mounted to a mounting bar extending between the two connecting plates and a leaf spring extending rearward from the mounting bar for biasing the scraper blade into contact with the conveyor belt.

BRIEF DESCRIPTION OF THE DRAWINGS

These aspects and features of the invention are described in more detail in the following description, appended claims, and accompanying drawings, in which:

FIG. 6 is an isometric view of a homogenous carryway according to an embodiment of the invention;

FIG. 7 is a bottom view of the homogenous carryway of FIG. 6;

FIG. 8 is a detailed view of the pins on the bottom of the carryway of FIG. 7;

FIG. 9 is an isometric side view of an outfeed carryway and belt lifter according to an embodiment of the invention FIG. 10 is an isometric front view of an outfeed carryway and belt lifter according to an embodiment of the invention;

FIG. 11 is an isometric rear view of an outfeed carryway and belt lifter according to an embodiment of the invention FIG. 12 is an isometric side view of an infeed carryway lifter according to an embodiment of the invention;

FIG. 13 is an isometric front view of an infeed carryway lifter according to an embodiment of the invention;

FIG. 14 is an isometric rear view of an infeed carryway lifter according to an embodiment of the invention;

FIG. 29 is an exploded view of the position limiter-scraper assembly of FIG. 28;

FIG. 42 is a side view of a sensor suitable for monitoring a hollow interior of a conveyor frame according to an embodiment of the invention;

FIG. 43 is a top view of the sensor of FIG. 42;

FIG. 44 is a cross-sectional view of the sensor of FIG. 43;

FIG. 45 is an isometric view of the sensor of FIG. 42;

FIG. 46 is a front view of a vacuum tool and sensor during the process of inserting the sensor into cand show the process of inserting a sensor into a port for a hollow according to an embodiment of the invention;

FIG. 47 is a front view of the vacuum tool and sensor of FIG. 46 during evacuation of the hollow FIG. 48 is a front view of the vacuum tool and sensor of FIG. 46 while the vacuum tool seals the hollow with the sensor;

FIG. 49 is a front view of the vacuum tool and sensor of FIG. 46 after releasing the vacuum tool, leaving the sensor to monitor the hollow according to an embodiment of the invention;

DETAILED DESCRIPTION

Figure 1:
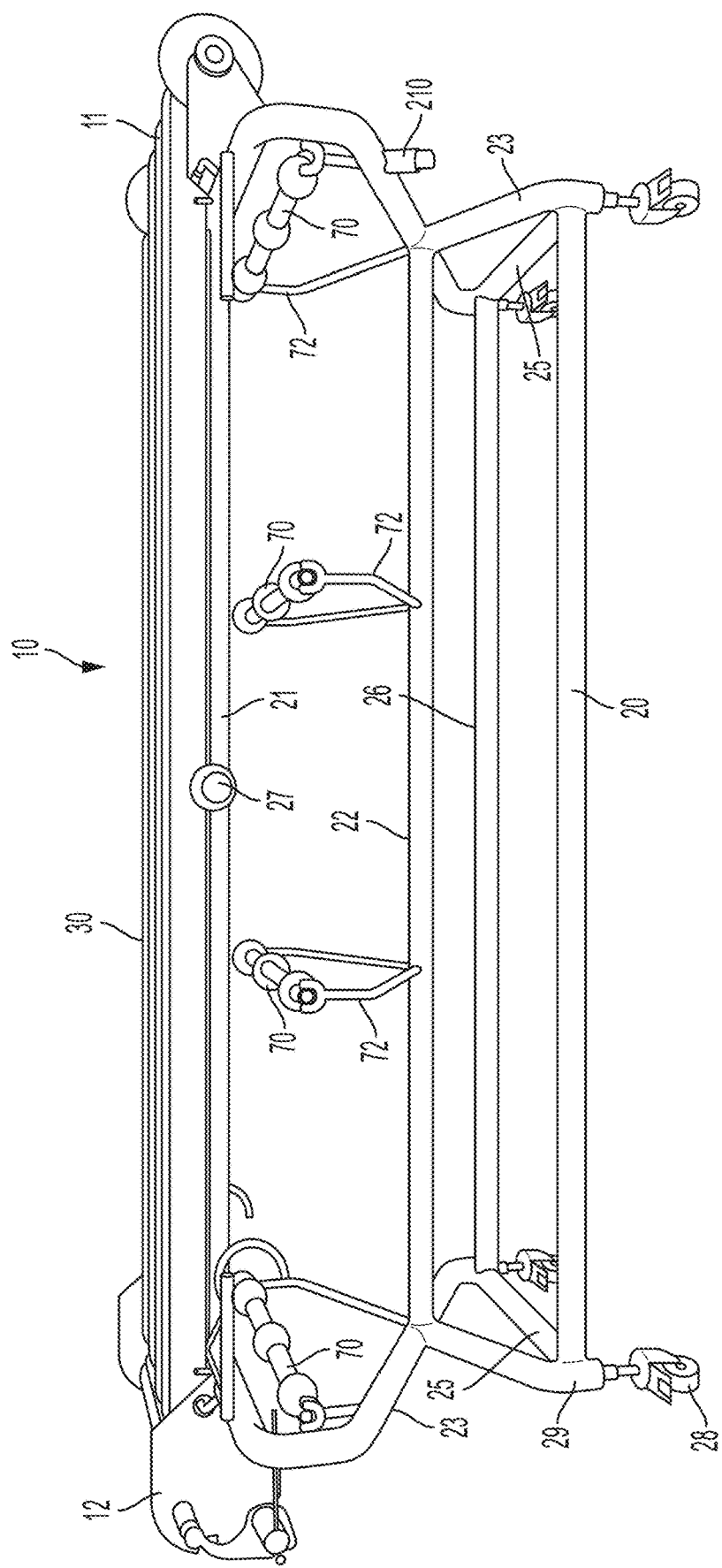
FIG. 1 is an isometric side view of a hygienic conveyor frame according to an embodiment of the invention.

A conveyor frame embodying features of the invention is shown in FIGS. 1-5. The exemplary conveyor frame 10 supports a conveyor belt 40 (shown in FIG. 4) traveling between a first end, the infeed 11, of the frame and a second end, outfeed 12, of the frame. The conveyor belt conveys products from the first end 11 to the second end 12 along a carryway. The conveyor belt 40 may be trained around reversing elements at each end of the carryway and returned along a returnway 42 below the carryway. The frame 10 minimizes components through simplification and integration to enhance cleanability while ensuring sufficient strength.

The illustrative frame 10 comprises a plurality of hollow tubular sections forming support structure 20 for a carryway. A carryway 30 is mounted to the support structure for guiding the conveyor belt from the infeed 11 to the outfeed 12. The infeed 11 comprises opposing mounting plates 110 configured to mount an infeed guide roller 114 and other infeed components if required. The outfeed 12 comprises opposing mounting plates 120 configured to mount a drive 124 for the conveyor belt and other outfeed components. The frame also includes returnway rollers 70 mounted to returnway mounts 72 below the carryway 30.

The illustrative support structure 20 comprises a plurality of round, hollow stainless-steel sections joined so as to provide support for the carryway 30. The round rails are strong, yet lightweight and less expensive than solid stainless steel. The hollow interior of the support structure 20 is evacuated to inhibit growth of any living organisms within the interior, to kill most living organisms within the interior, and sealed to prevent contamination. A sensor 210 may be provided to monitor the seal and provide an alarm or initiate other corrective action if the seal is broken.

While the invention is not so limited, the support structure 20 comprises an upper longitudinal rail 21 spanning the length of the carryway, a lower longitudinal spine 22, transverse support rails 23 at the infeed and outfeed ends, lateral upper rails 24 at the infeed and outfeed ends of the upper longitudinal rail 21, legs 29 and additional lateral and longitudinal support rails 25, 26 extending between the legs. A middle support axle 27 with two end rollers extends laterally above the upper longitudinal spine 21. Wheels 28 may extend below the legs 29. The invention is not limited to the illustrative configuration, and a plurality of round, hollow tubes may be joined in any suitable configuration to provide support for a carryway.

Figure 2:
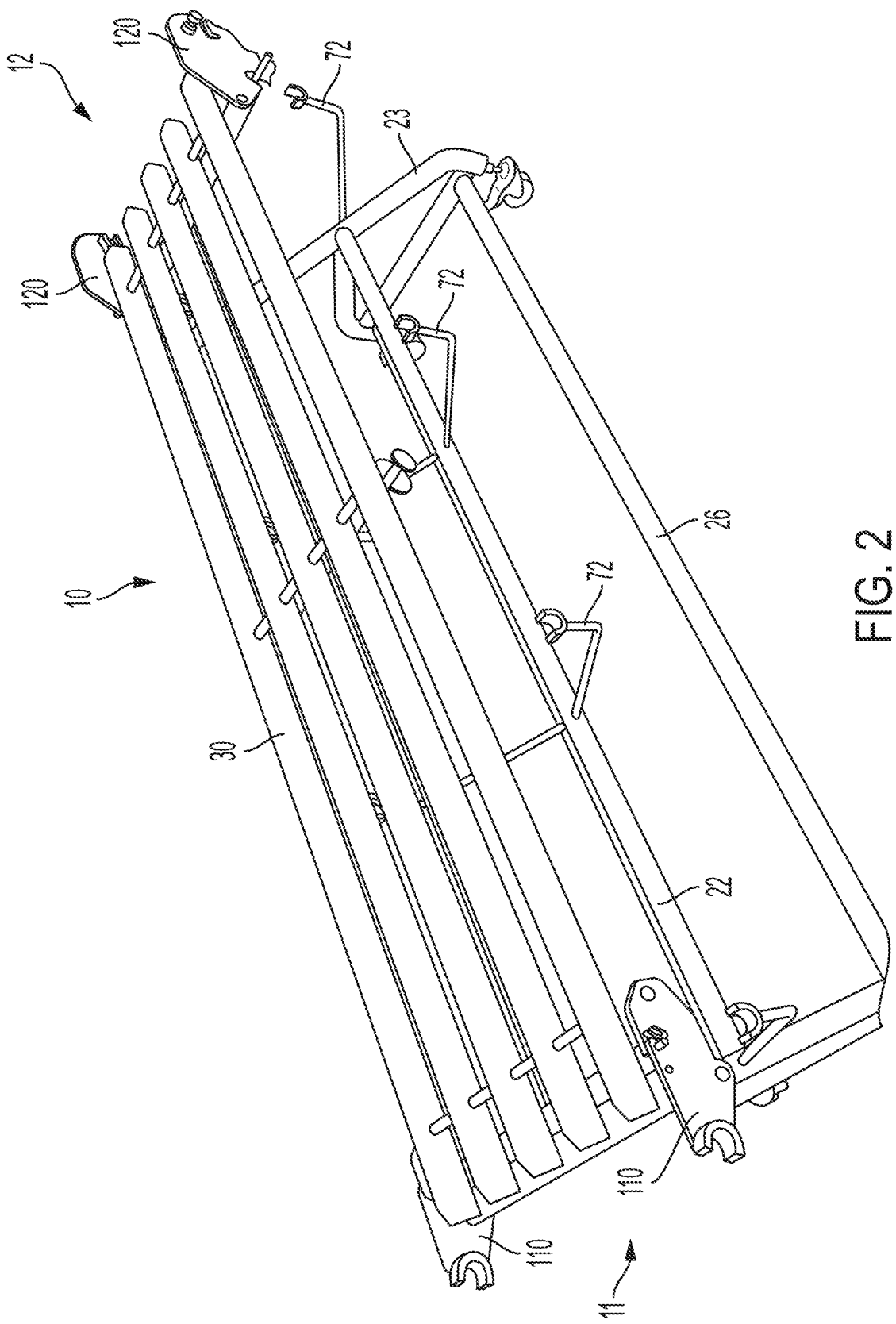
FIG. 2 is an isometric top-side view of the hygienic conveyor frame of FIG. 1.
Figure 3:
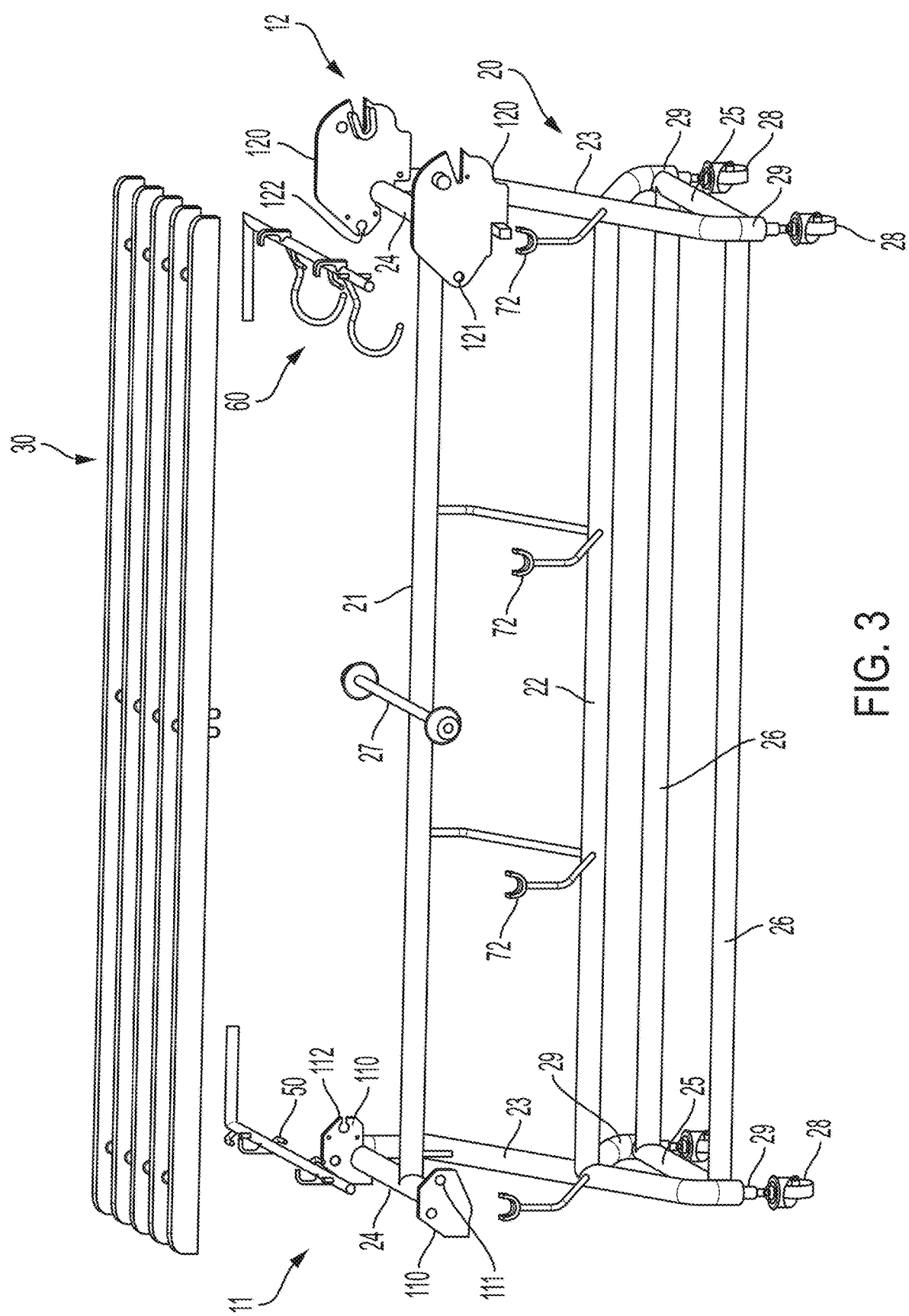
FIG. 3 is an exploded view of the hygienic conveyor frame of FIG. 1.
Figure 5:
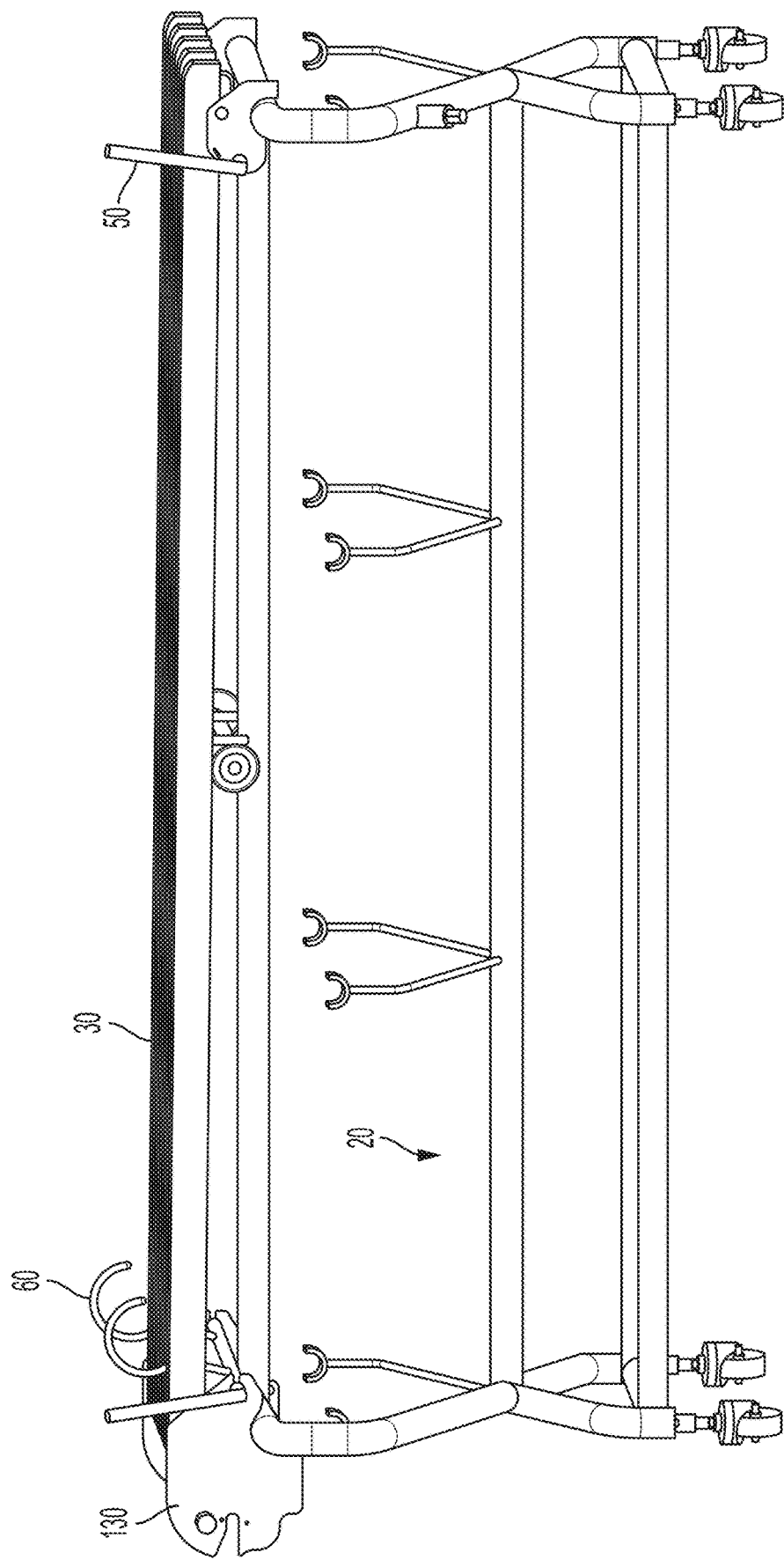
FIG. 5 shows the hygienic conveyor frame of FIG. 1 with the carryway lifted in a cleaning mode.

The illustrative carryway 30, shown in FIGS. 6-8, is a unitary, homogenous structure formed of a low friction material, such as UHMW. The carryway comprises a plurality of longitudinal rails 31 for supporting the conveyor belt connected by lateral rails 32, 33, 34. When inserted onto the support structure 20, the longitudinal rails 31 extend from the infeed 11 to the outfeed 12 in this particular embodiment. The carryway 30 further includes pins 36 extending from the bottom for engaging the middle support axle 27. As shown in FIG. 8, the pins 36 extend from the bottom of two of the longitudinal rails 31 on each side of the middle lateral rail 33. The unitary carryway 30 sits on top of the support structure 20, as shown in FIGS. 1, 2 and 5, and as described in detail below.

Figure 4:
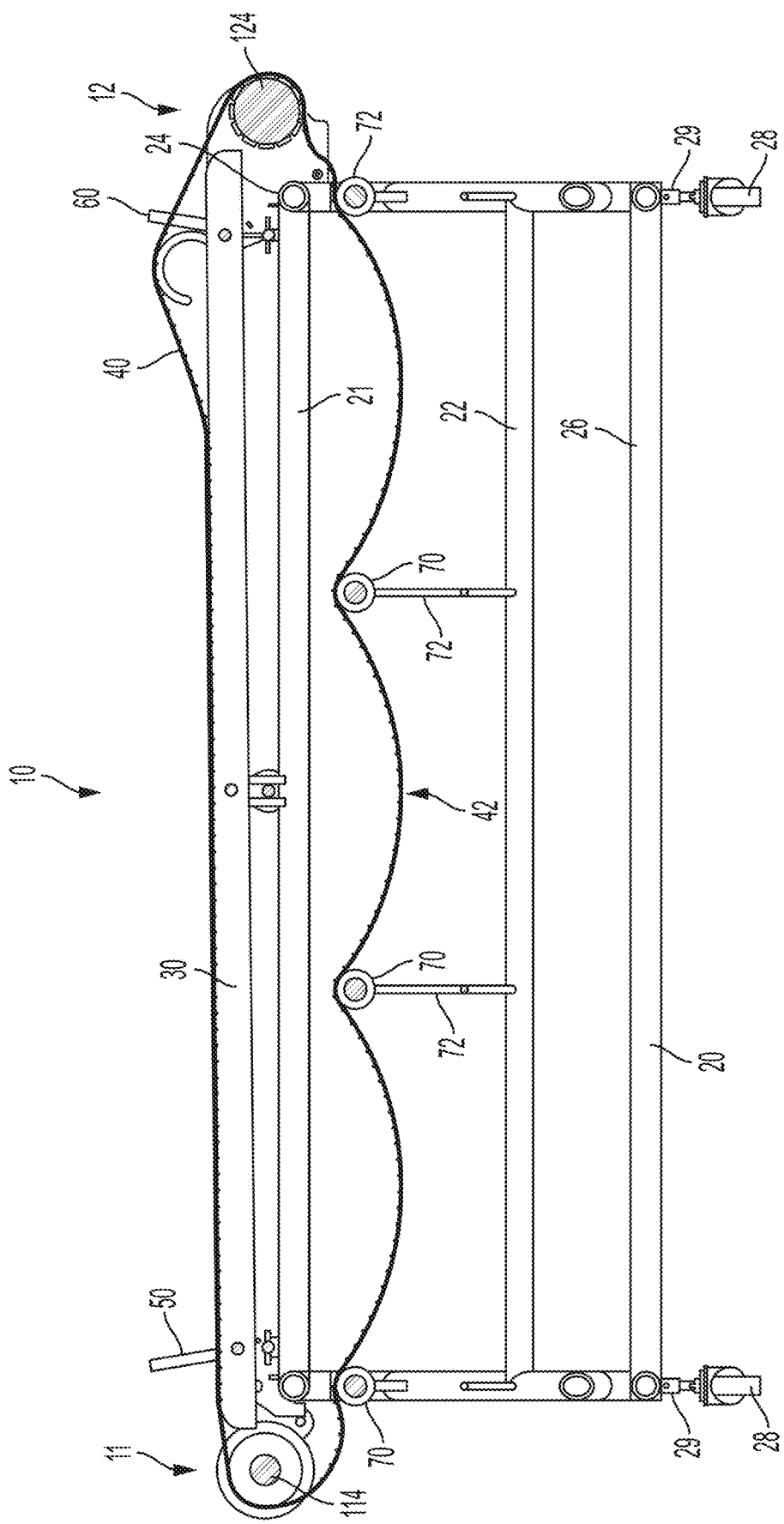
FIG. 4 is a side view of view of the hygienic conveyor frame of FIG. 1 with a conveyor belt trained around the infeed and outfeed end, with the conveyor belt and carryway lifted in a cleaning mode.

The conveyor frame 10 further includes at least one belt and carryway lifter, shown as infeed lifter 50 and outfeed lifter 60, for locking the position of the carryway during operation and selectively lifting the carryway and conveyor belt to allow cleaning or other access. FIGS. 1 and 2 show the lifters 50, 60 in a down, operating position in which the carryway 30 lies flat above the support structure 20. FIGS. 4 and 5 show the lifters 50, 60 in a lift position, in which the carryway 30 is raised at an angle above the support structure 20 and the conveyor belt 40 is lifted above the carryway 30 for cleaning and access.

FIGS. 9-11 show the illustrative outfeed lifter 60. The outfeed belt lifter 60 comprises a lateral rail 61 that spans the width of the carryway. The lateral rail 61 is received in openings 121, 122 in the outfeed mounting plates (See FIGS. 3 and 25). One opening 121 may be a closed hole and the other 122 an open slot with a narrow mouth. The lateral rail 61 may have a notch or other narrowing to facilitate insertion into the open slot 122. A handle 62 extends from a first end of the lateral rail in a forward direction. The illustrative handle 62 is perpendicular to the lateral rail 61, though the invention is not so limited, and is horizontal in an operating position. The outfeed lifter 60 includes latching arms 63 extending up from the lateral rail, 90° offset from the handle. The latching arms 63 form open seats for a lateral rail 32 of the carryway, facing the same direction as the handle 62 extends. Hooked arms 64 for raising the conveyor belt 40 extend forward down at an obtuse angle from the lateral rail, with the hooks facing downwards. L-shaped arms 65 are disposed between the hooked arms 64 and include a stem portion extending slightly forward and down from the lateral rail at a smaller angle than the hooked arms 64 and a perpendicular support portion that is parallel to the lateral rail 61 for contacting the bottoms of two carryway longitudinal rails 31 to lift the carryway. Vertical pins 66 are located outside the latching arms 63 and extend up and down from the lateral rail 61 for locking side guards 170, 171 securely in position when the carryway 30 is in operating position. A stop 68, comprising an L-shaped arm extends up and slightly rearward from the latera rail 61 between the handle 62 and pin 66 to limit rotation of the lifter.

In the illustrative embodiment, the placement of the elements of the lifter about the periphery of the lateral rail facilitates locking of the carryway during operating and lifting of the carryway and conveyor belt during cleaning.

FIGS. 12-14 show the illustrative infeed lifter 50, which is similar to the outfeed lifter, without the hooked arms 64. The components of the infeed lifter 50 are basically mirror images to the components of the outfeed lifter 60, without the hooked arms 64. The infeed belt lifter 50 comprises a lateral rail 51 that spans the width of the carryway. The lateral rail 51 is received in openings 111, 112 in the infeed mounting plates. One opening 111 may be a closed hole and the other 112 an open slot with a narrow mouth. The lateral rail 51 may have a notch or other narrowing to facilitate insertion into the open slot 112A. handle 52 extends from a first end of the lateral rail 51. The infeed lifter 50 includes latching arms 53 extending up from the lateral rail 51 forming open seats for a lateral rail 34 of the carryway. L-shaped arms 55 are disposed between the latching arms 54 and include a stem portion extending from the lateral rail 51 and a perpendicular support portion that is parallel to the lateral rail 51 for contacting the bottoms of two carryway longitudinal rails 31 to lift the carryway. The L-shaped arms 55 have a shorter stem portion than the L-shaped arms 65, so that the infeed lifter 50 lifts the carryway less than the outfeed lifter 60. Vertical pins 56 are located outside the latching arms 53 and extend up and down from the lateral rail 51 for locking side guards 170, 171 securely in position when the carryway 30 is in operating position. A stop 58, comprising an L-shaped arm extends up and slightly opposite the latching arms between the handle 52 and pin 56 to limit rotation of the lifter.

Figure 15:
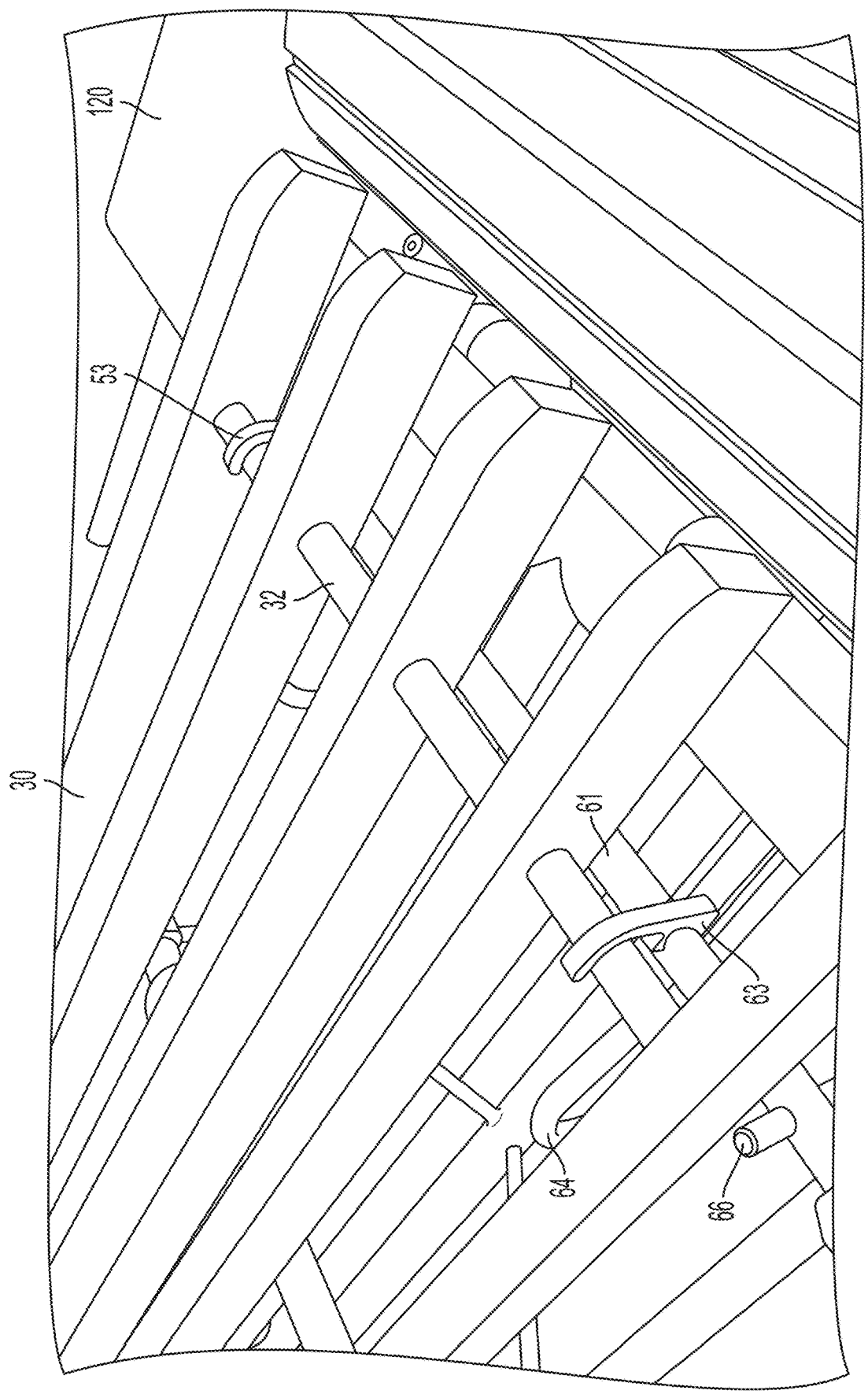
FIG. 15 is a detailed, close-up view showing an outfeed lifter in a lowered, operating position.

FIG. 15 is a detailed, close-up view showing the outfeed lifter 60 in a lowered, operating position. The outfeed lifter 60 is rotatably mounted to the outfeed plates 120. In this position, latching arms 63 engage the lateral rail 32 of the carryway to prevent longitudinal movement of the carryway. Pins 66 prevent lateral movement of the carryway 30 when the carryway is lifted in its cleaning position. Hooked arms 64 are lowered below the carryway and away from the belt, and L-shaped arms 65 are also lowered and out of contact with the carryway rails 31.

Figure 16A:
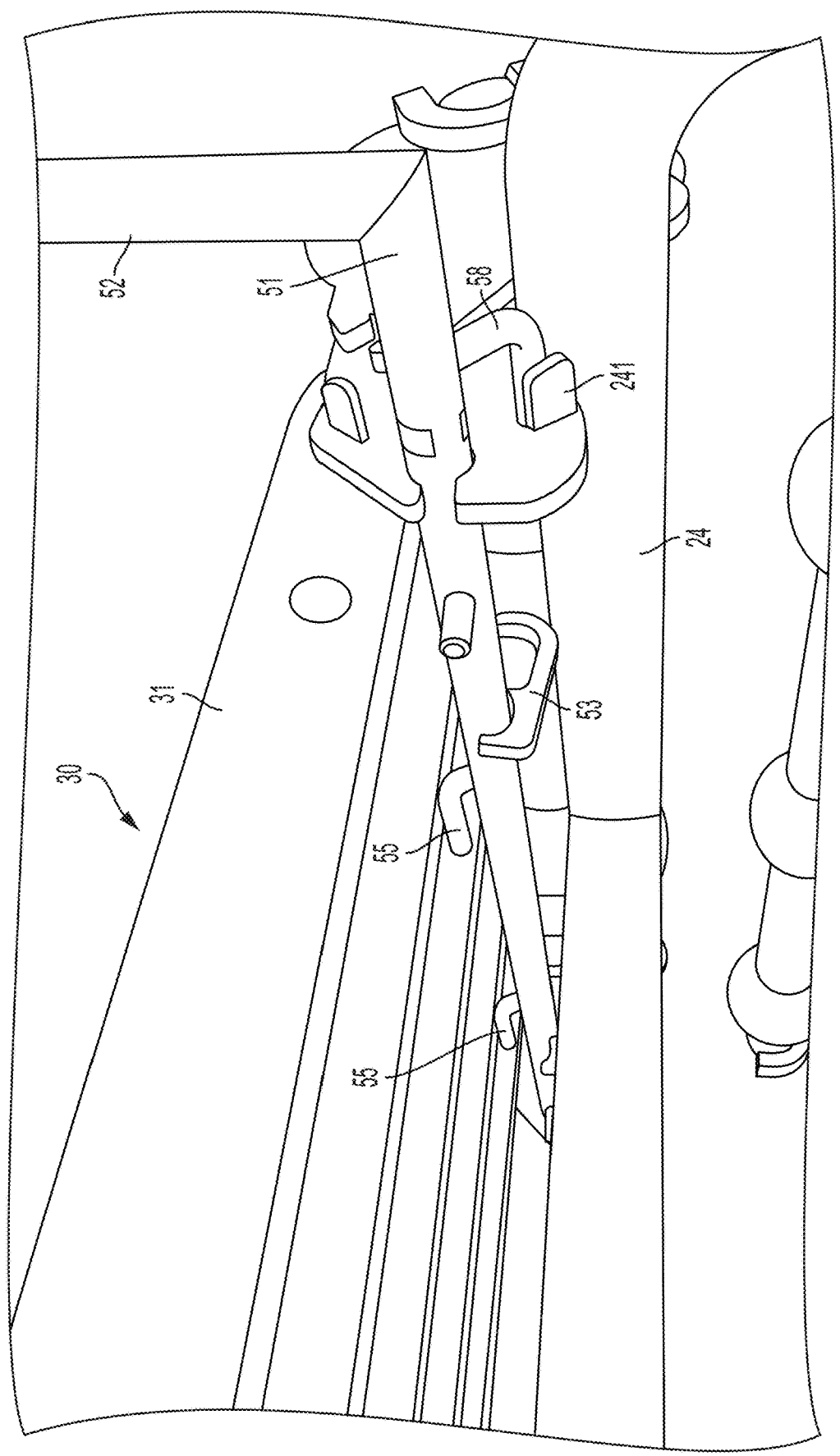
FIG. 16A is a detailed, close up view showing the infeed lifter of FIGS. 12-14 in a raised, cleaning position.

FIG. 16A is a detailed, close up view showing the infeed lifter 50 in a raised, cleaning position. The handle 52 is rotated up until arm 58 abuts a stop 241 on the lateral arm 24 of the side plate 112. Rotation of the handle about rail 51 causes the latching arms 53 to disengage the carryway lateral rail 34 and the L-shaped arms 55 to move up, pushing the carryway rails 31 up.

Figure 16B:
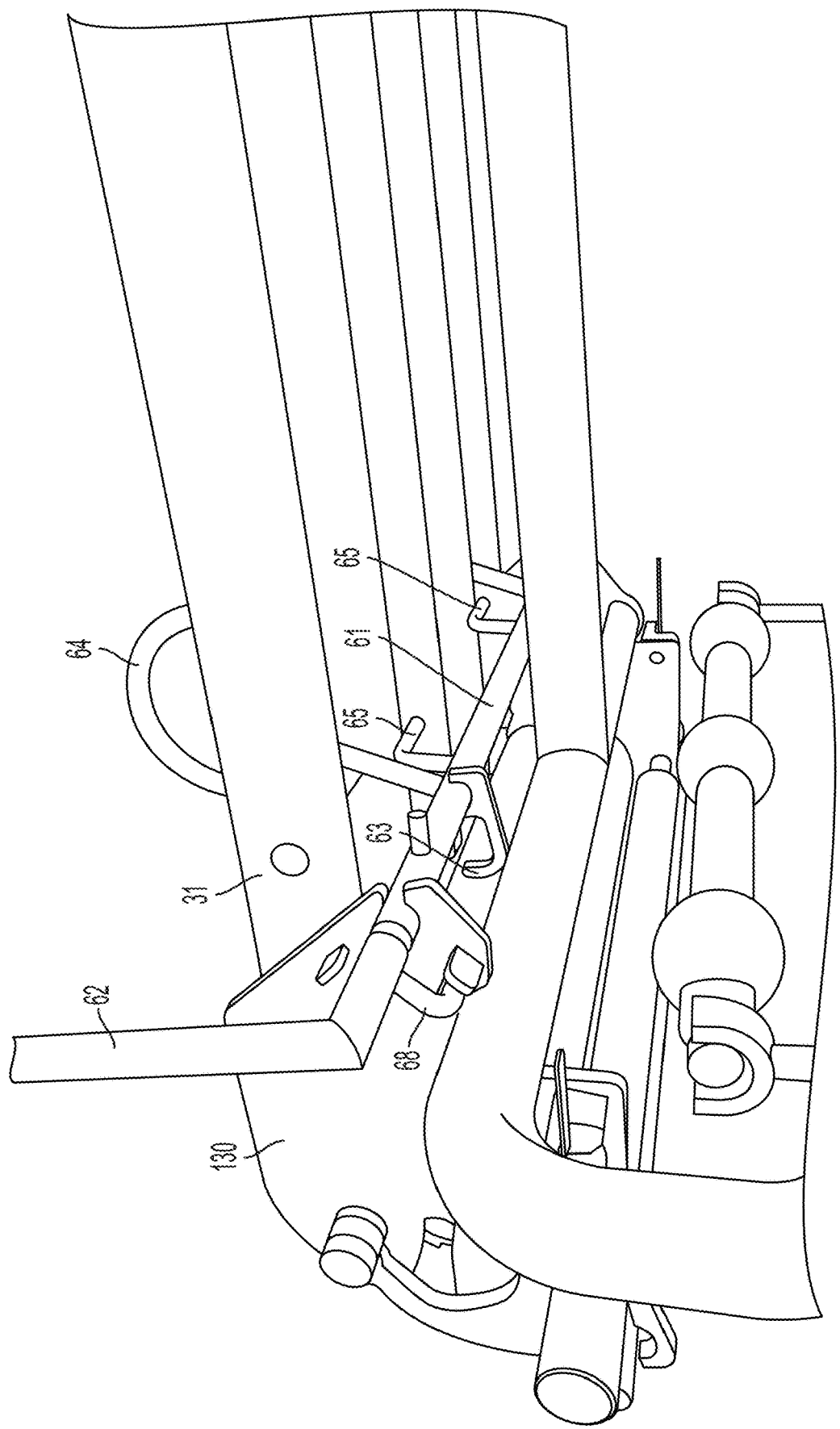
FIG. 16B is a detailed, close up view showing the outfeed lifter of FIGS. 9-11 in a raised, cleaning position.

FIG. 16B is a detailed, close up view showing the outfeed lifter 60 in a raised, cleaning position. When handle 62 is rotated up until arm 68 abuts stop 242 on the side plate 121. Rotation of the handle about rail 61 causes the latching arms to disengage the carryway lateral rail 32 and the L-shaped arms 65 to move up, pushing the carryway rails 31 up. Hooked arms 64 rise above the carryway rails to push the conveyor belt above the carryway. Since L-shaped arms 65 are higher than L-shaped arms 55, the outfeed of the carryway 31 is raised higher than the infeed.

Figure 17:
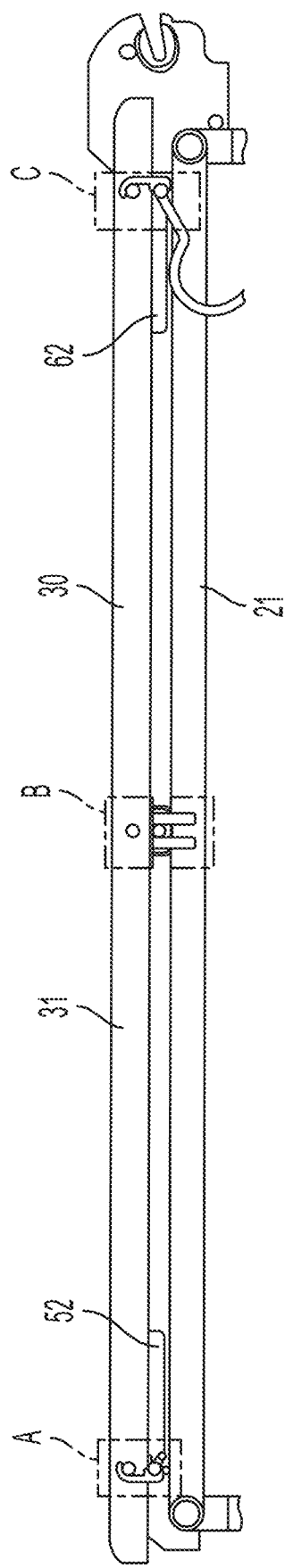
FIG. 17 is a cross-sectional side view of the conveyor frame and carryway of FIG. 1 in an operating position, with the lifters lowered.
Figure 20:
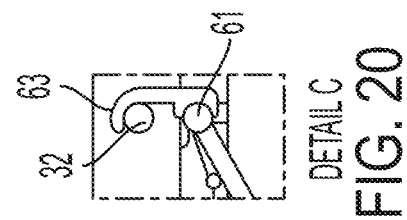
FIG. 20 is a detailed view of an outfeed portion of the embodiment of FIG. 17.
Figure 19:
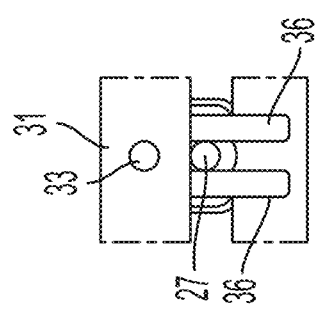
FIG. 19 is a detailed view of a middle region of the embodiment of FIG. 17.
Figure 18:
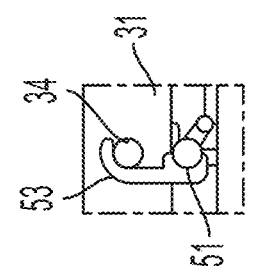
FIG. 18 is a detailed view of an infeed portion of the embodiment of FIG. 17.

FIG. 17 is a cross-sectional side view of the top portion of the conveyor frame in an operating position, with the lifters 50 and 60 lowered. FIG. 18 is a detailed view of the infeed portion of FIG. 17. FIG. 19 is a detailed view of the middle portion of FIG. 17 and FIG. 20 is a detailed view of the outfeed portion of FIG. 17. In the operating position, the handles 52, 62 are horizontal and extend toward the longitudinal middle of the conveyor. Latching arms 53, 63 engage lateral rails 34, 32 on the carryway 30 and pins 36 engage the middle axle 27 of the frame with clearance and prevent longitudinal movement of the carryway 30 when it is raised to ensure the latching arms 53, 63 are able to re-engage the lateral rails 34, 32 when it is lowered. The carryway 30 rests on lifter lateral arms 51, 61 during operation.

Figure 21:
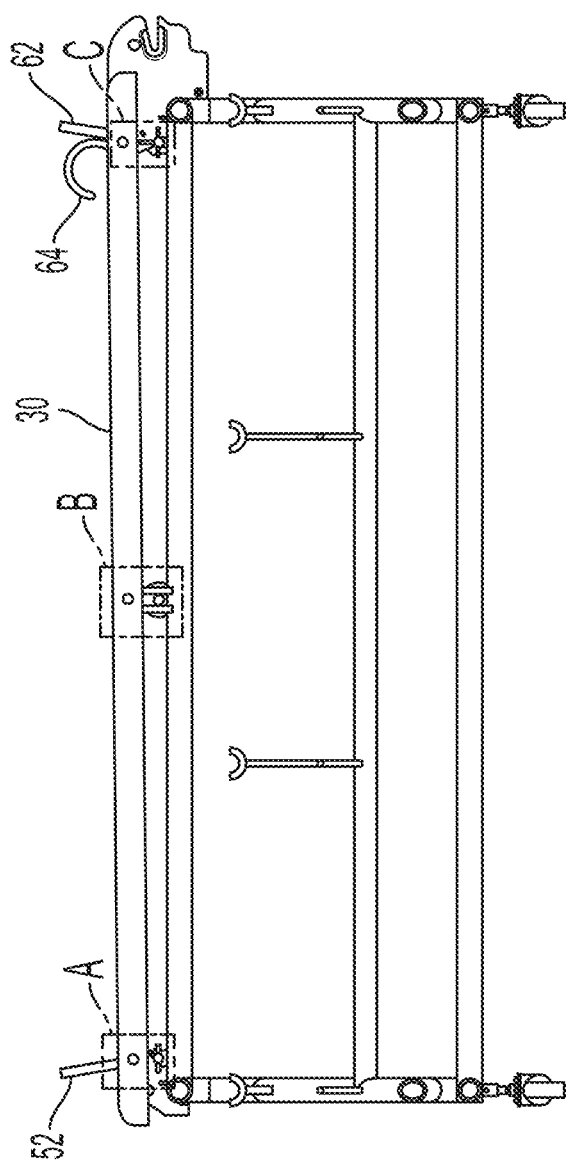
FIG. 21 is a cross-sectional side view of the conveyor frame and carryway of FIG. 1 in an cleaning position, with the lifters raised.
Figure 24:
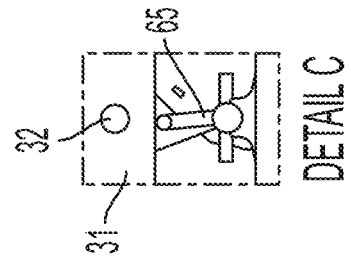
FIG. 24 is a detailed view of an outfeed portion of the embodiment of FIG. 210.
Figure 23:
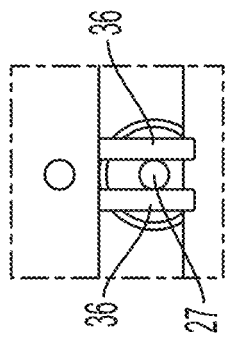
FIG. 23 is a detailed view of a middle region of the embodiment of FIG. 21.
Figure 22:
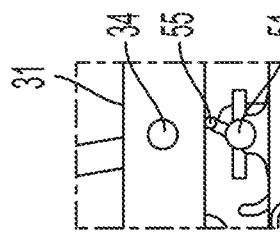
FIG. 22 is a detailed view of an infeed portion of the embodiment of FIG. 21.

FIG. 21 is a cross-sectional side view of the conveyor frame in a cleaning position, with the lifters 50 and 60 raised. FIG. 22 is a detailed view of the infeed portion of FIG. 21. FIG. 23 is a detailed view of the middle portion of FIG. 21 and FIG. 24 is a detailed view of the outfeed portion of FIG. 21. To lift the carryway and belt, the handles 52, 62 are rotated to a raised position, shown in FIG. 21. The rotation of the hands 52, 62 rotates the connected lateral rails 51, 62, causing the latching arms 53, 63 to disengage the lateral carryway rails 34, 32 and pushing the L-shaped arms 55, 65 to a raised position. The L-shaped arms raise the carryway rails 31. The L-shaped arms 65 rise higher, so the raised carryway is higher at the outfeed end. The hooked arms 64 also rise, pushing up the conveyor belt, if present. The pins 36 continue to engage the middle axle 27 to maintain the longitudinal position of the carryway.

Figure 25:
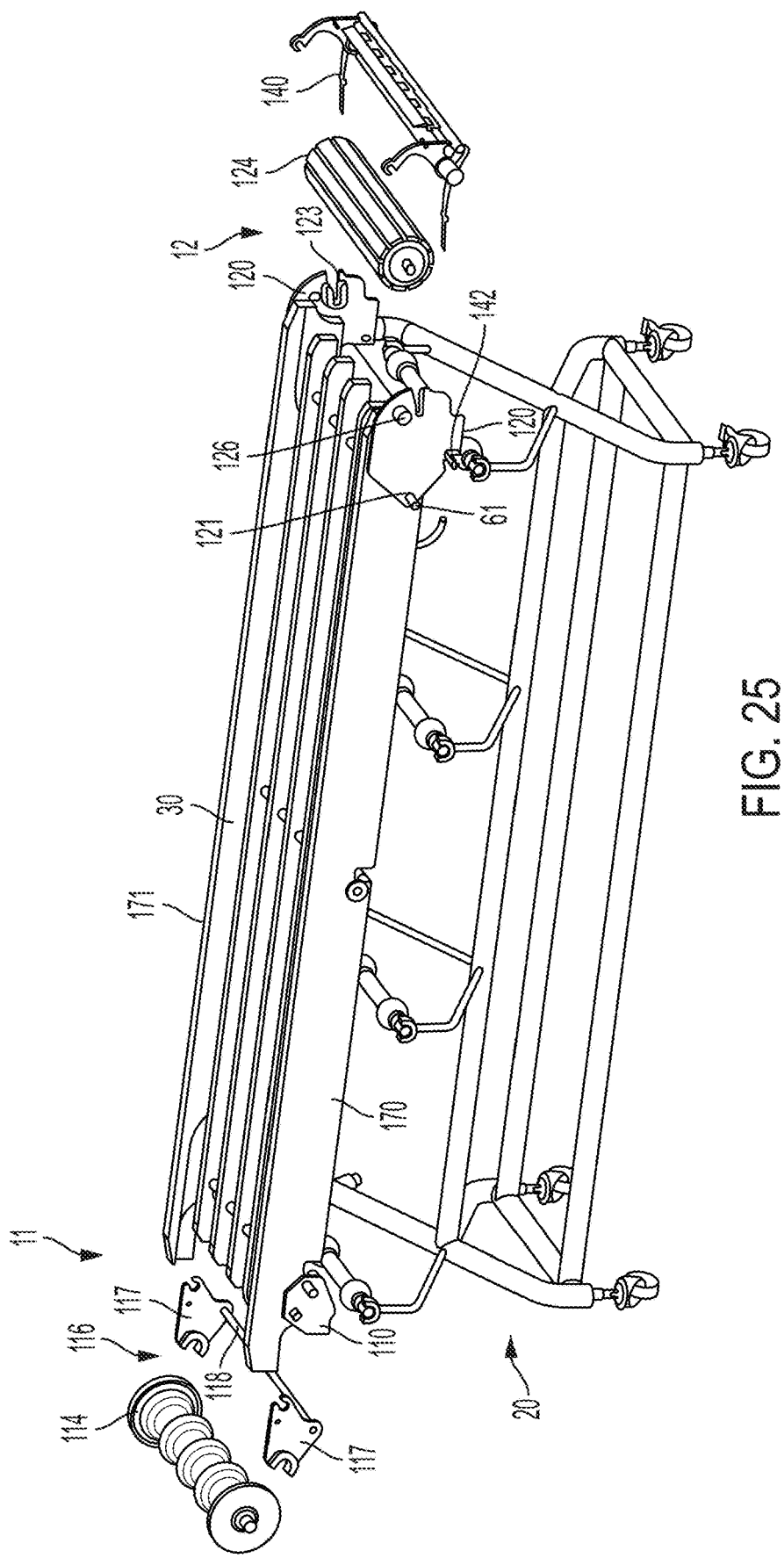
FIG. 25 is an exploded view of the conveyor frame of FIG. 1.
Figure 27:
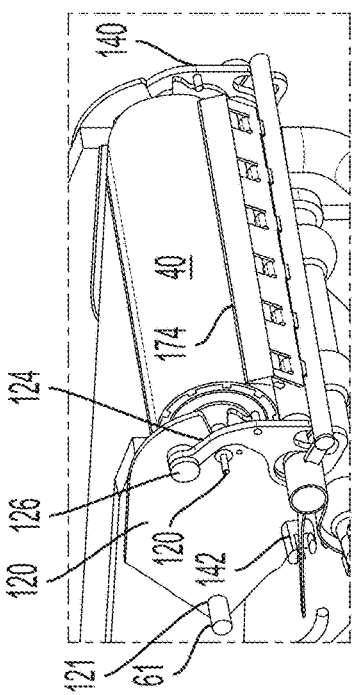
FIG. 27 is a detailed view of the outfeed portion of the conveyor frame of FIG. 26.
Figure 26:
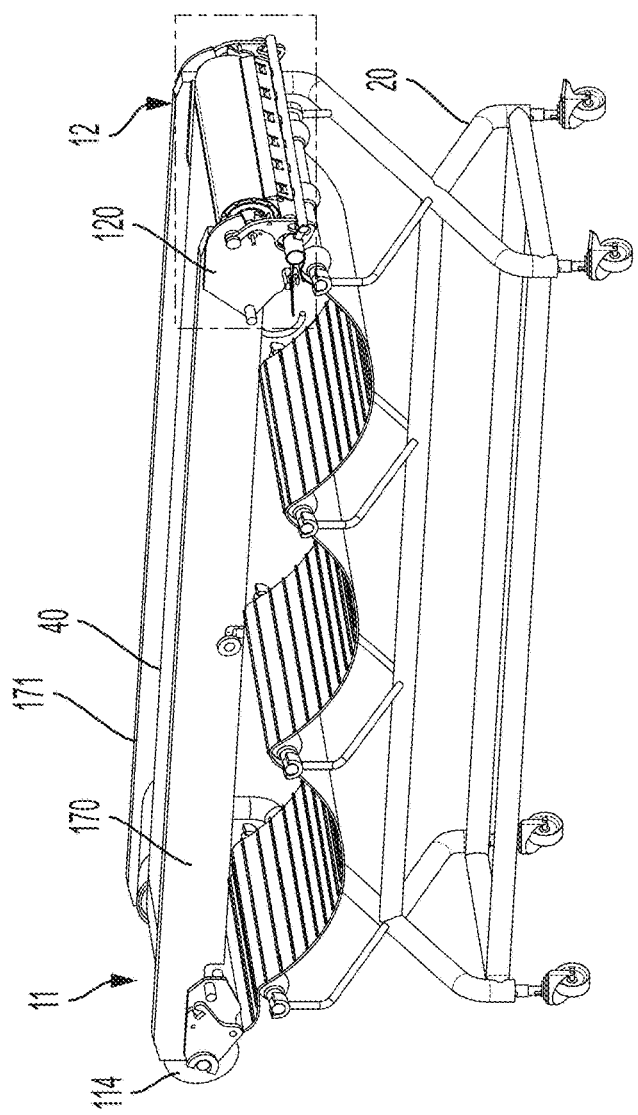
FIG. 26 is another view of the conveyor frame of FIG. 1.

The illustrative hygienic conveyor also includes drive and infeed belt guides that are easy to clean. Referring to FIGS. 25-27, the outfeed 12 comprises opposing mounting plates 120 at the outfeed end of the carryway. The infeed 11 comprises opposing infeed plates 110 at the infeed end of the carryway for mounting a roller-mounting assembly 116 comprising opposing roller-mounting plates 117 connected by a rail 118 and a shaped infeed roller 114 mounted to the roller-mounting plates 117 for guiding the conveyor belt from the returnway to the carryway.

Each illustrative outfeed mounting plate 120 comprises a front opening, shown as a slot 123 with an integral inner bearing, for mounting a drive axle of a conveyor belt drive, shown as a motorized sprocket 124. Above the slot, the mounting plate 120 includes a protrusion 126 forming a pivot mount for a position limiter-scraper assembly 140. The mounting plate 120 further includes a rear opening 121, 122 for mounting the outfeed belt lifter 60. In the illustrative embodiment, opening 121 is a closed hole, while opening 122 is a slot open to the rear edge of the corresponding mounting plate to facilitate mounting of the belt lifter 60. A latch 142 extends from the bottom of the mounting plate 120 for latching a leaf spring or other retainer on the position limiter-scraper assembly 140, as described below.

The illustrative hygienic conveyor shown in FIGS. 25-27 further includes side guards 170, 171 mounted to the frame for containing the conveyor belt 40 on the carryway. In one embodiment, one or both of the lifters 50, 60 can be used to lock the side guards 170, 171 in place.

Figure 28:
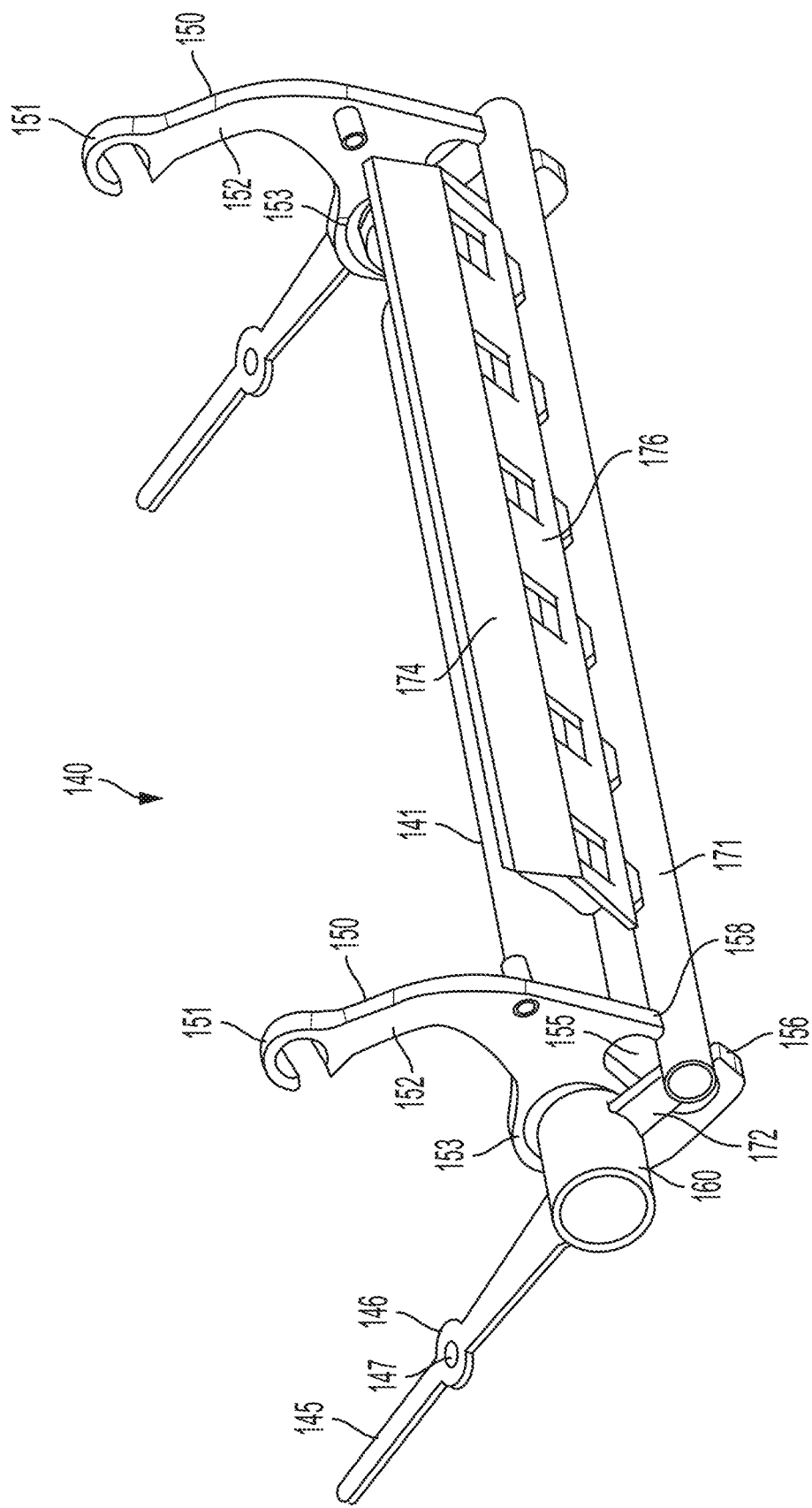
FIG. 28 is an isometric view of a position limiter-scraper assembly for a conveyor frame according to an embodiment of the invention.

The position limiter-scraper assembly 140, an embodiment of which is shown in FIGS. 28 and 29 comprises a roller limiter 141 comprising a roller extending from a first end to a second end and axles 143 extending from each end of the roller. During operation of the conveyor belt, the roller limiter is designed to ensure proper engagement between the drive elements on the conveyor belt and the drive structure on the drive 124.

Opposing limiter connecting plates 150 connect the roller limiter 141 to the conveyor frame. Each limiter connecting plate 150 comprises an upper hook 151 for mounting the plate to an outfeed mounting plate 120 via protrusion 126. A curved neck portion 152 forms a nook for the protruding axle of the drive 124. Below the upper hook 151, an elongated opening 153 receives a cylindrical cap 160 housing a bearing 161 for rotatably mounting the roller limiter axle 143. Adjacent the elongated opening 153 an outward facing opening 155 includes top and bottom protrusions 158, 156 forming a narrowed mouth to the opening 155 enabling pivot of the scraper axle 171 about the fixed point of the roller limiter axle 143.

The limiter connecting plates 150 also mount a scraper assembly that contact the outer surface of the conveyor belt during operation to remove dirt and debris. A scraper mounting bar 171 extends between the two limiter connecting plates. The scraper mounting bar 171 extends through the narrowed mouth of the opening 155. During operation, the scraper mounting bar 171 can move between the upper protrusion 158 and the lower protrusion 156 of the limiter connecting plates 150 as it pivots under tension about the axis of the cylindrical cap 160. When the scraper blade 174 wears sufficiently, the scraper mounting bar 171 will finally come into contact with the upper protrusion 158 and will cease to apply pressure to the belt, thereby requiring replacement of the scraper blade 174. If a large obstruction passes between the belt 40 and scraper blade 174, the scraper bar 171 will pivot downward and can come into contact with the lower protrusion 156, which limits the amount of movement the scraper blade 174 can move away from the belt 40. Arms 172 connect each end of the scraper mounting bar 171 to the cylindrical cap 160. A scraper blade 174 is mounted in scraper mounting taps 176 that extend from the scraper mounting bar 171.

A tensioning and locking mechanism, shown as leaf spring 145, extends rearward from the cylindrical cap 160 for locking the position limiter assembly 140 in an operating position and applying pressure to bias the scraper into a scraping position against the conveyor belt. The leaf spring 145 comprises an enlarged central portion 146 with an opening 147 for engaging the latch 142 of the outfeed mounting plate 130. The illustrative leaf spring 145 utilizes 316 type stainless steel, which is cold rolled to harden it and make it suitable for use as a spring, though the invention is not limited. Any suitable means for tensioning the scraper may be used.

In an operating mode, shown in FIGS. 26 and 27, the leaf spring 145 or other retainer is locked, and the limiter connecting plate 150 is positioned relative to the mounting plate 130 to place outfeed components in operating position. The roller limiter 141 is disposed relative to the conveyor belt 40 to ensure proper engagement of the belt with the drive 124. The cylindrical cap 160 is seated in the bottom of the opening 153. The scraper blade 174 is biased into contact with the outer surface of the conveyor belt to remove debris. The scraper mounting bar 171 operates between the lower protrusion 156 and upper protrusion 158 of the mouth of the position limiter connecting plate 150. The infeed roller 114 is positioned by the roller-mounting assembly to guide the conveyor belt from the returnway to the carryway.

Figure 32:
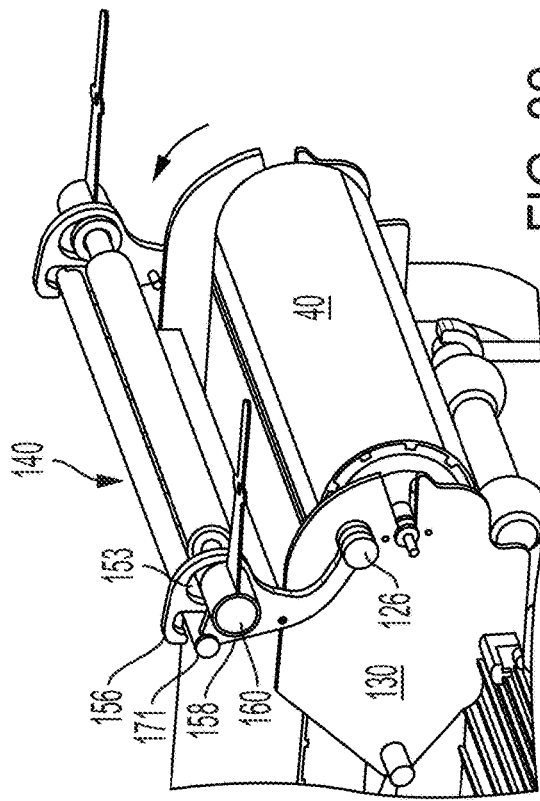
FIG. 32 is an isometric view of the position-limiter scraper assembly of FIG. 30 in a cleaning position.
Figure 31:
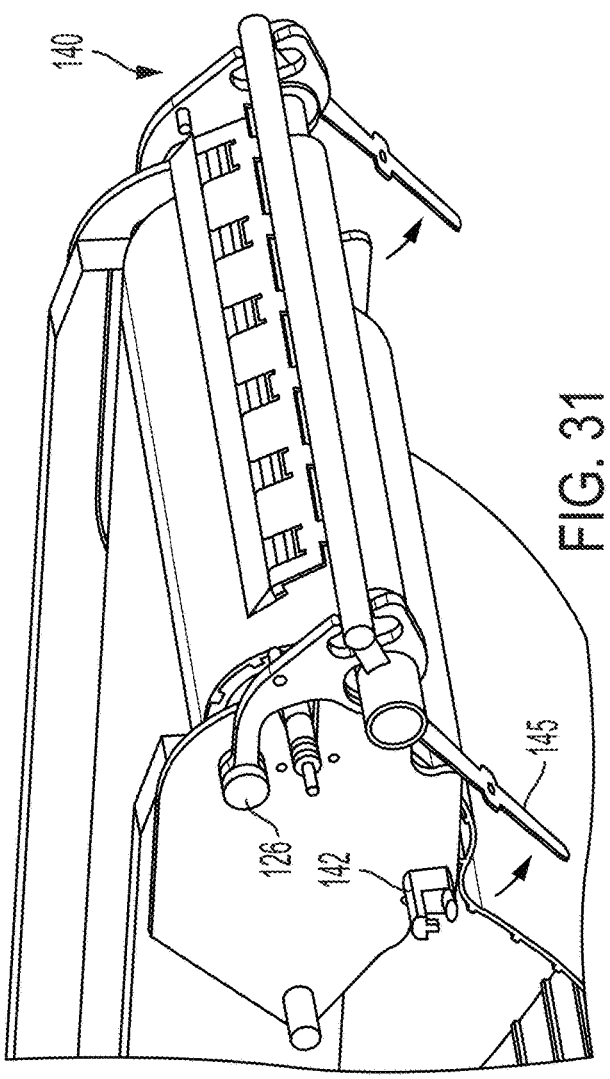
FIG. 31 is an isometric view of the position-limiter scraper assembly of FIG. 30 during a transition from the operating position to a cleaning position.
Figure 30:
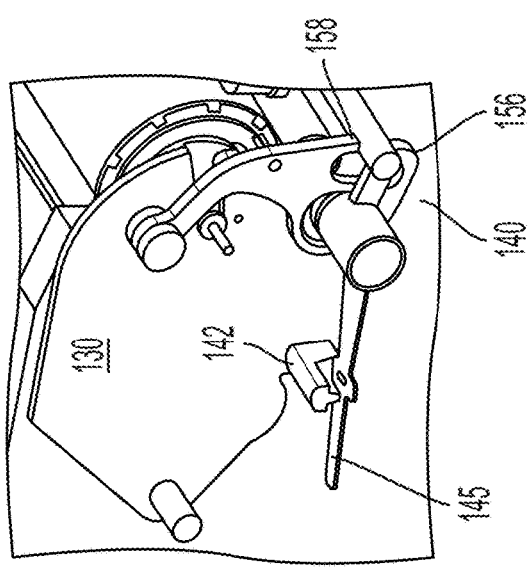
FIG. 30 is an isometric view of the position limiter-scraper assembly of FIG. 27 after unlatching it from an operating position.

To move the position limiter assembly 140 to a cleaning position, the leaf spring 145 is unlatched from the latch 142, as shown in FIG. 30, and the position limiter assembly 140 is rotated up and out of position about the pivot point 126, as shown in FIG. 31. The position limiter assembly 140 can continue to rotate up to a cleaning position shown in FIG. 32, until the drive portion of the conveyor belt is exposed, allowing access for cleaning, repair or another purpose. In the cleaning position, the cylindrical cap 160 falls into the opposite end of the opening 153 to allow access and cleaning of the opening 153. The scraper mounting bar 171 falls onto the upper protrusion 158 to allow access for cleaning.

The position limiter assembly 140 can then be easily rotated back into the operating position and latched into place.

Figure 33:
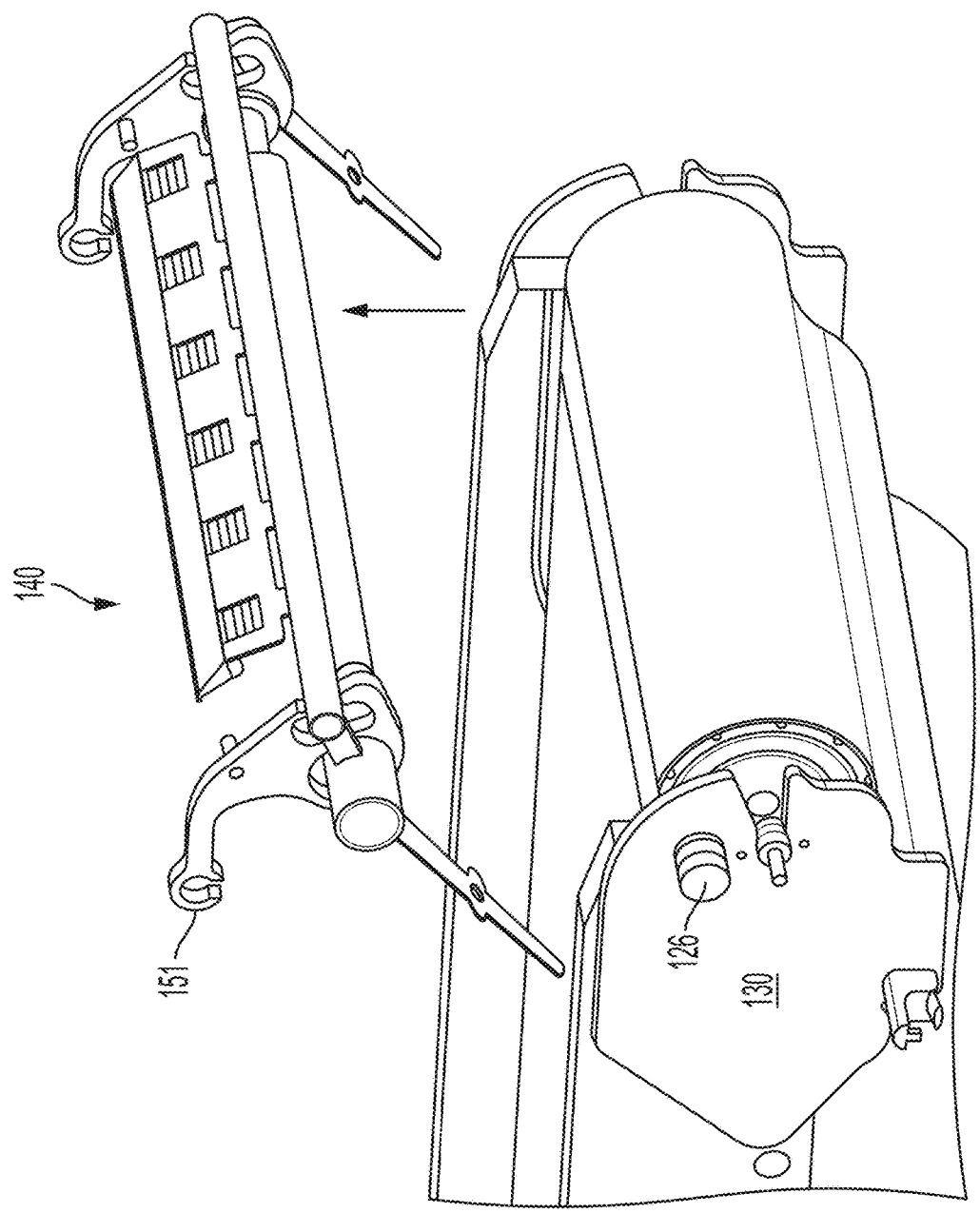
FIG. 33 shows the removal of the position limiter-scraper assembly of FIG. 27 from the conveyor frame.
Figure 35:
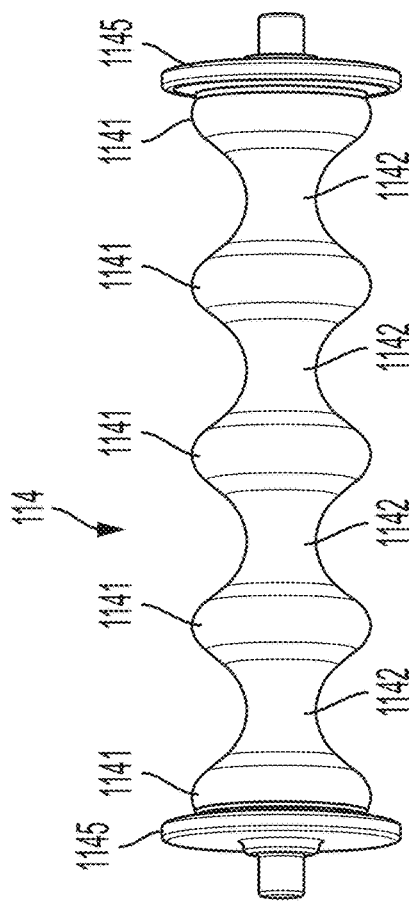
FIG. 35 is a front view of the contoured infeed roller of FIG. 34.
Figure 37:
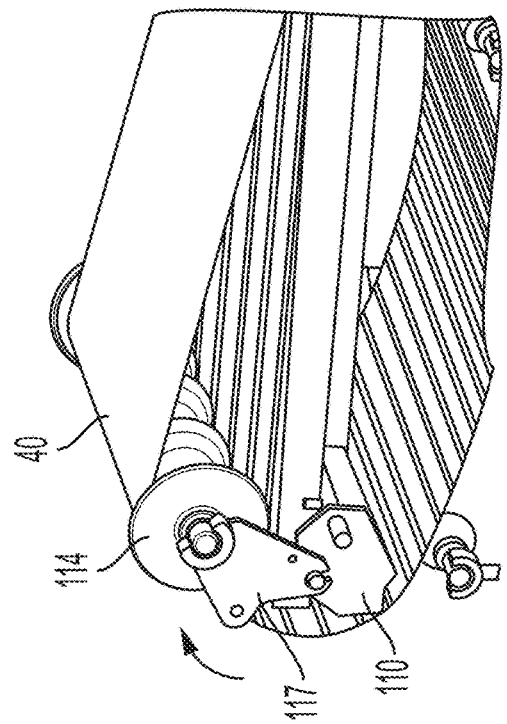
FIG. 37 is a detailed view of an infeed portion of a conveyor when the contoured infeed roller of FIG. 34 is in a raised position.
Figure 34:
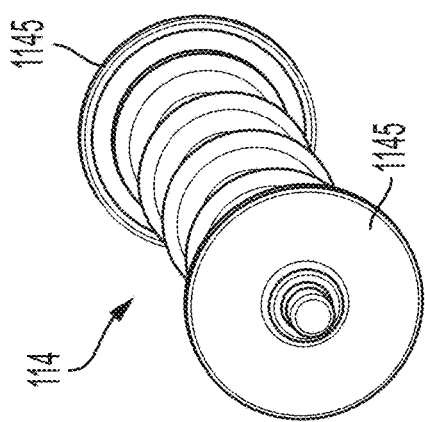
FIG. 34 is an isometric view of a contoured infeed roller of an embodiment of the invention.
Figure 36:
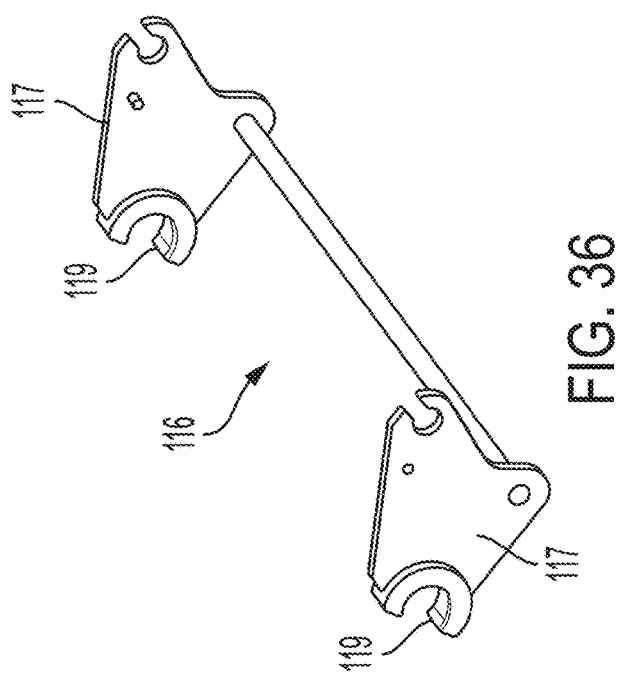
FIG. 36 is an isometric view of infeed roller mounting plates for mounting the roller of FIG. 34 to a conveyor frame.
Figure 38:
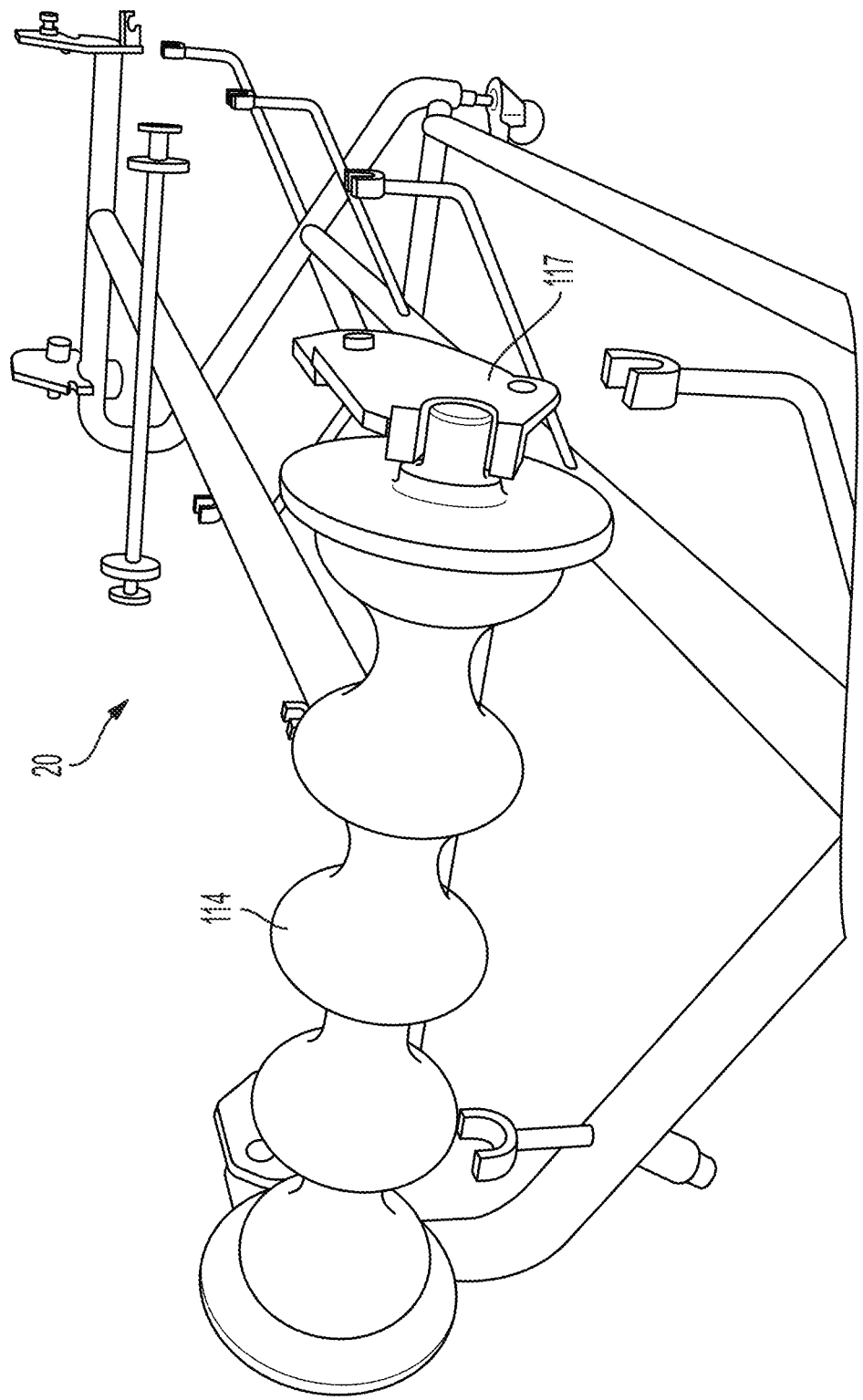
FIG. 38 is a front view of a conveyor frame including the contoured infeed roller of FIG. 34.

Alternatively, due to the open upper hook 151, the position limiter assembly 140 can be removed entirely from the conveyor frame by lifting the assembly up and out of engagement with the pivot point 126 after release of the latch, as shown in FIG. 33.

Referring to FIGS. 34-39, the infeed guide roller 114 and roller mounting assembly 116 can also be rotated out of place to facilitate cleaning. The roller mounting plates 117 include an open seat 119 facing outwards for mounting axles on the infeed guide roller 114. An open seat 113 mounts each roller mounting plate 117 to a corresponding infeed plate 110 and allows pivoting of the assembly 116 about the mounting plates 110 attached to the infeed end of the carryway.

Figure 39:
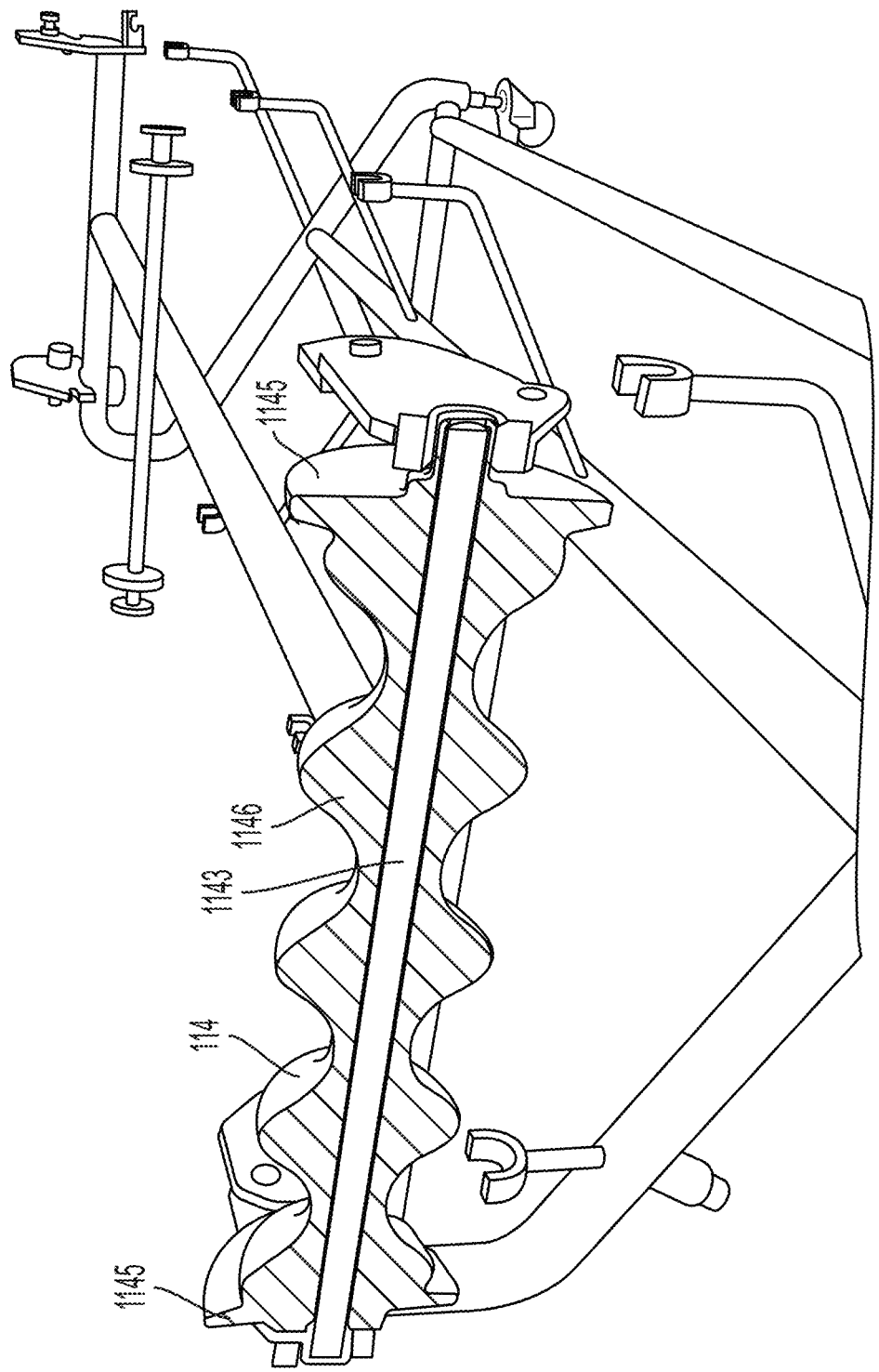
FIG. 39 is a cross-sectional view of the contoured infeed roller of FIG. 38.

The illustrative guide roller 114, as described below, comprises a contoured shaped roller having a series of convex and concave curves forming peaks 1141 and troughs 1142. The guide roller comprises a fully encapsulated central shaft 1143, which may be stainless steel to provide strength, and molded plastic encapsulating the central shaft and forming the contoured body. End discs 1145 may also be formed as part of the unified body of the roller 114 and disposed on each end of the guide roller 114 for containing the conveyor belt. As shown in FIG. 39, the shaft 1143 may be entirely encapsulated in the plastic 1146, which may be UHMW, forming the body of the roller and the end discs 1145. The sculpted design of the roller 114 minimizes roller contact with the conveyor belt and reduces the spread of product while enabling the belt to be cleaned dynamically.

Figure 40:
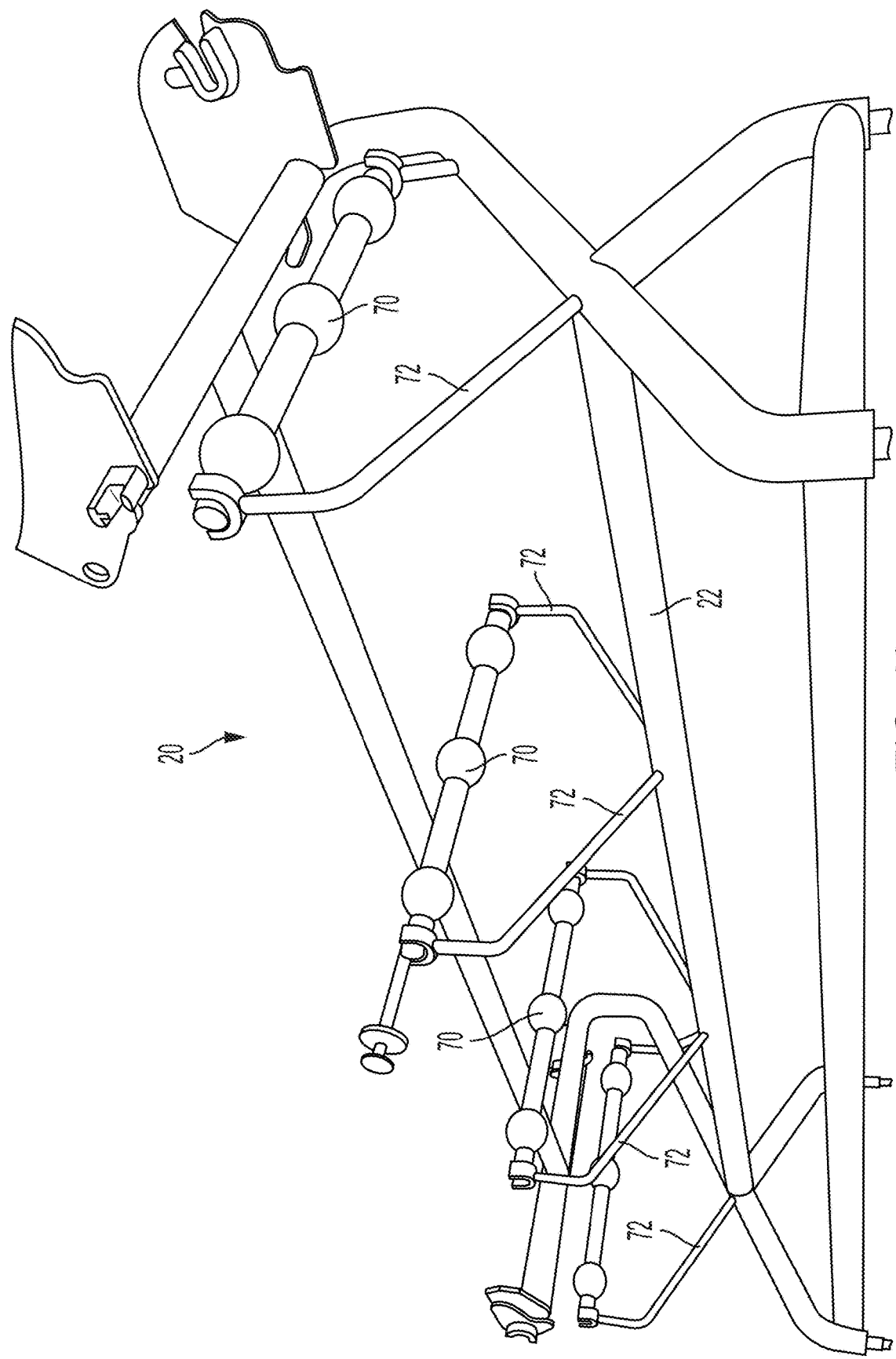
FIG. 40 is a bottom isometric view of a conveyor frame including contoured returnway roller according to an embodiment of the invention.

As shown in FIG. 40, the returnway rollers 70 may also comprise a shaped roller body with rounded wider portions 174 and narrower portions 175. The illustrative rollers also comprise a central shaft, such as stainless steel, encapsulated in plastic, such as UHMW. The returnway rollers 70 are seated in returnway roller mounts 72, which comprise rails extending up from lower spine 22 and terminating in open seats that receive the encapsulated ends of the returnway rollers.

Figure 41:
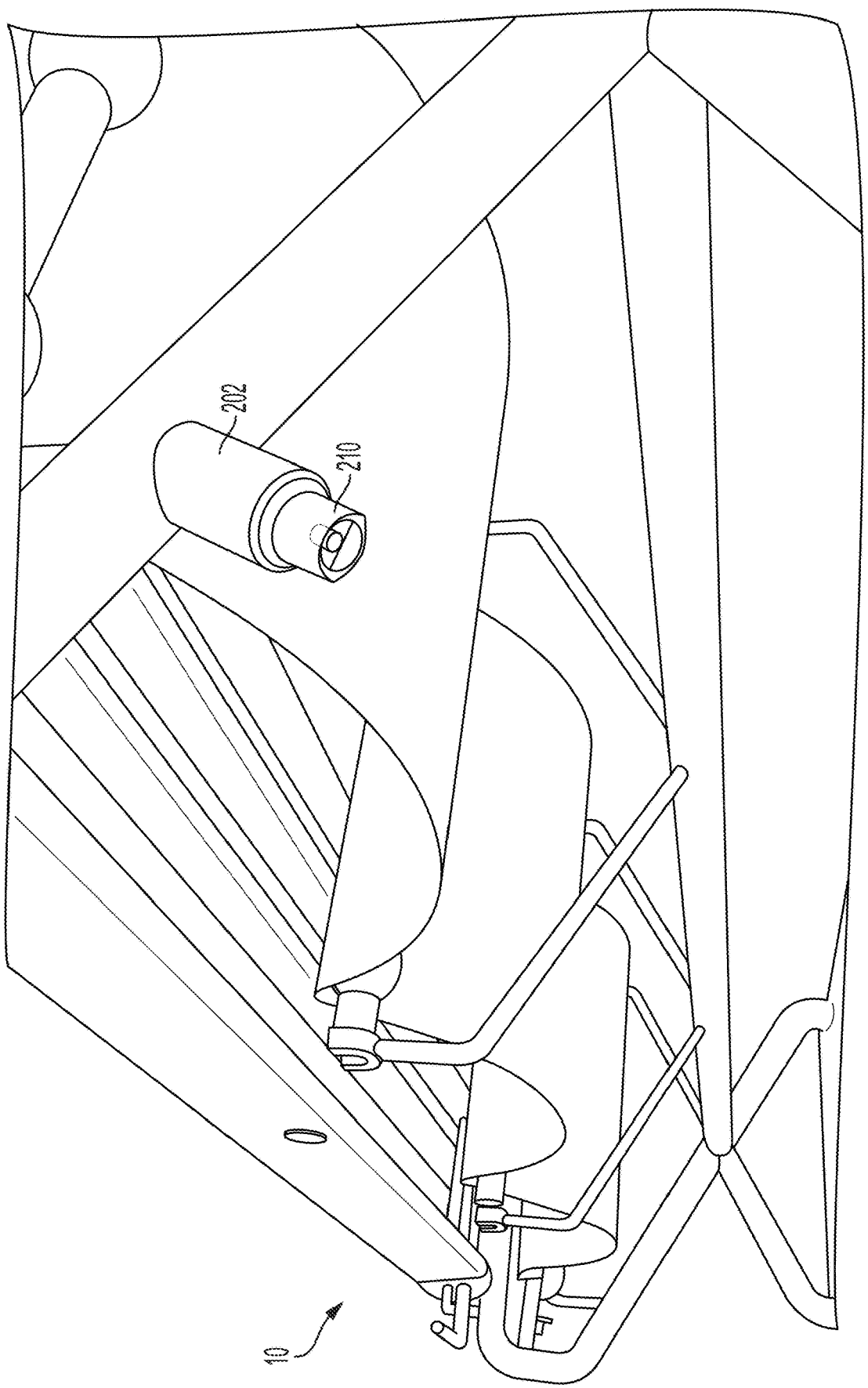
FIG. 41 shows a sensor in a conveyor frame used to monitor a hollow interior of the conveyor frame according to another embodiment of the invention.
Figure 52:
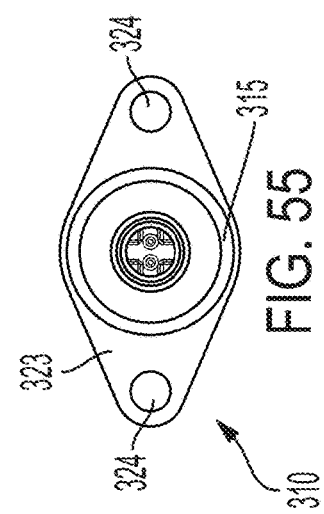
FIG. 52 is a top view of the sensor of FIG. 50.
Figure 55:
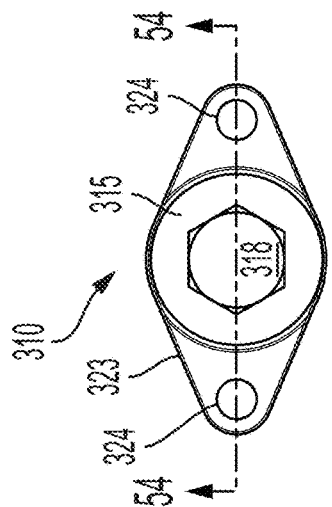
FIG. 55 is a bottom view of the sensor of FIG. 50.
Figure 51:
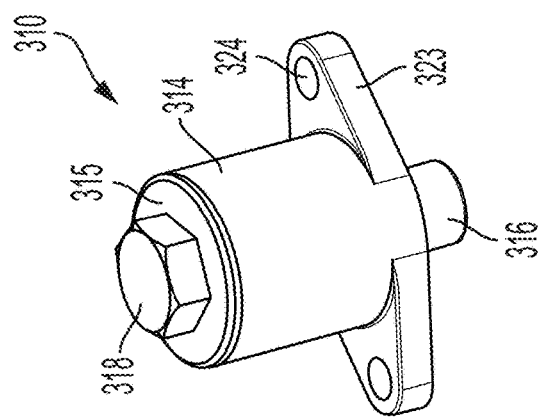
FIG. 51 is another view of the sensor of FIG. 50.
Figure 54:
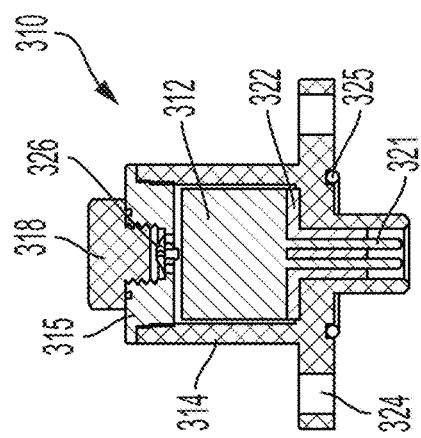
FIG. 54 is a cross-sectional view of the sensor of FIG. 50.
Figure 50:
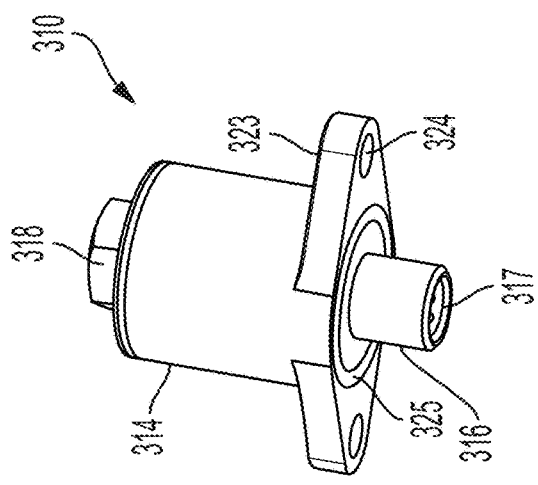
FIG. 50 is an isometric view of a sensor suitable for monitoring a hollow interior of a conveyor frame according to another embodiment of the invention.
Figure 53:
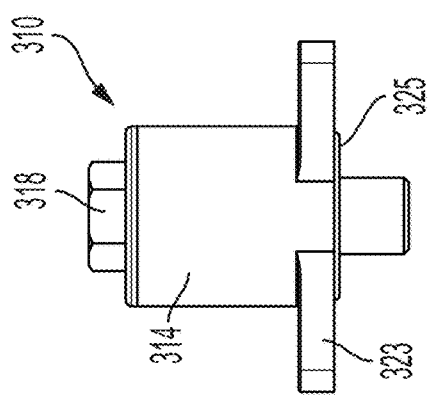
FIG. 53 is a side view of the sensor of FIG. 50.
Figure 60:
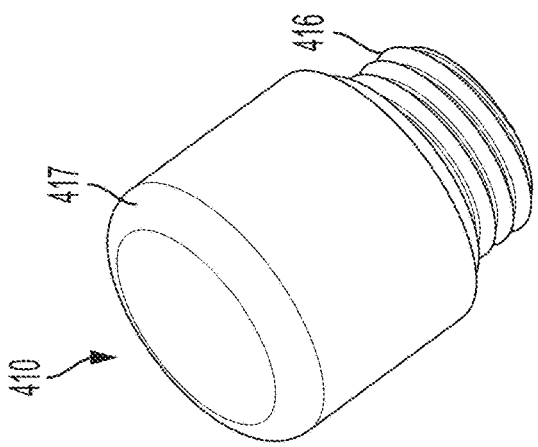
FIG. 60 is another view of the sensor of FIG. 56.
Figure 59:
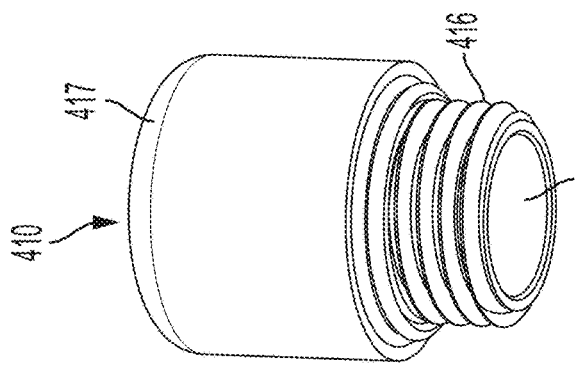
FIG. 59 is an isometric view of the sensor of FIG. 56.
Figure 58:
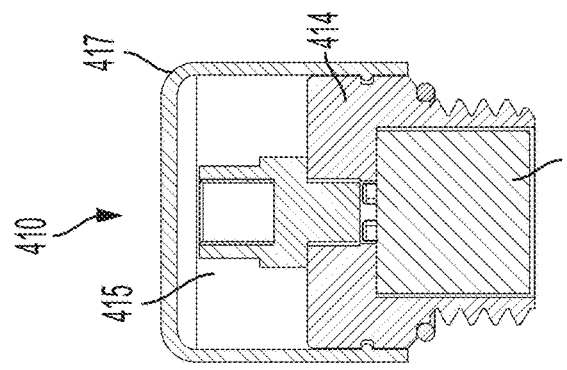
FIG. 58 is a cross-sectional view of the sensor of FIG. 56.
Figure 56:
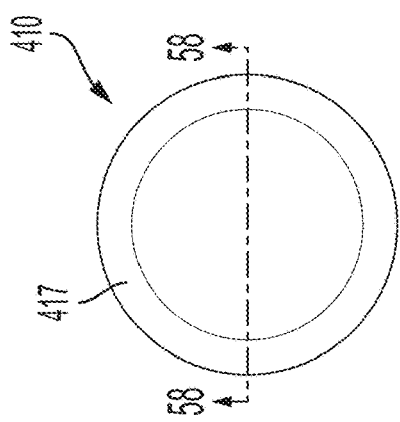
FIG. 56 is a top view of a sensor suitable for monitoring a hollow interior of a conveyor frame according to another embodiment of the invention.
Figure 57:
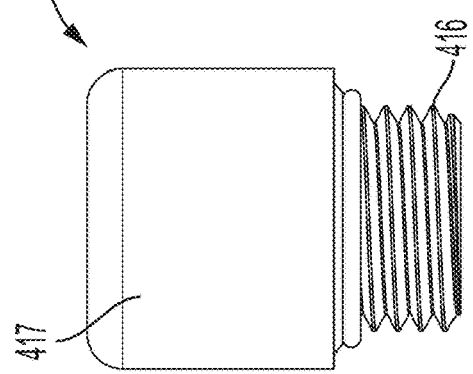
FIG. 57 is a side view of the sensor of FIG. 56.

As previously described, the illustrative hygienic conveyor frame 10 comprises a number of hollow round rails, which provides strength while reducing cost. The round rail promotes cleanliness, as there are no flats for water or product pooling. In one embodiment, a vacuum is drawn on the hollow interior of the rails and the vacuum is sealed. The vacuum inhibits the growth of all pathogens and other life within the hollow interior of the frame and kills most living organisms within the interior. As shown in FIG. 41, a sensor 210 monitors the hollow interior and initiates an alert or prescribed corrective action if the hollow is compromised. The sensor 210 is coupled to a port 202 in the conveyor frame and in communication with the hollow interior of the frame support structure 20.

The sensor can have any suitable size, shape, location, configuration or means of operating. Referring to FIGS. 42-45, one embodiment of a sensor 210 comprises a printed circuit board 212 wired to measure pressure. The printed circuit board 212 can include an indicator, such as a light-emitting diode, that lights up when the seal has been breached, or another condition is sensed. Other suitable indicators may be used. The printed circuit board 212 is housed in a housing 214. The electronics can be removable for repair or replacement. The housing 214 comprises a lower portion 215 having a threaded neck 216 for connecting to a corresponding port having interior threads in the conveyor frame, an interior opening for the sensor 212 and an open path 219 to a mouth 217 for placing the sensor 212 in communication with the conveyor frame hollow when the neck is inserted in the port of the frame. Any suitable means for creating a sealed connection between the port and sensor may be used, and the invention is not limited to a threaded connection. The illustrative lower portion 215 is formed of stainless steel. The sensor housing 214 also comprises a top portion 218 that coupled to the lower portion 215 to seal the sensor. In the illustrative embodiment, the top portion and lower portion 215 mate through a threaded connection, though the invention is not so limited. In the illustrative embodiment, the top portion 218 is formed of plastic. A seal, such as an O-ring 220 seals the interface between the upper and lower housing portions. Another seal, shown as O-ring 222 encircles the threaded neck 216 to seal the interface between the frame port and the sensor 210.

FIGS. 46-49 show the process of inserting the sensor 210, drawing a vacuum in a conveyor frame hollow and initiating monitoring of the conveyor frame hollow to ensure it remains sealed. A vacuum tool 350 is used to both insert the sensor 210 and draw sufficient vacuum in the connected conveyor frame hollow to effect a kill zone throughout the conveyor frame interior.

In cases where the pathogens of concern are not adequately killed by the vacuum a concentrated amount of ozone can be inserted into the evacuated hollow conveyor frame until the pathogens of concern have been killed. At such point the hollow conveyor frame can be re-evacuated to an appropriate level for the pressure monitor sensor to detect a future breach.

The vacuum tool 350 comprises a housing having a vacuum port 354 connected to an air hose that creates a vacuum. The housing has an open chamber 356 at one end that can fit over the sensor 210. A seal, such as O-ring 358 seals the opening of the chamber 356. The vacuum tool 350 further includes a wrench 360 that can move into the open chamber 356 and rotate within the open chamber 356 to screw the sensor 210 into the conveyor frame port 202.

In a first step, shown in FIG. 46, the sensor 210 is partially screwed into the port 202 of the conveyor frame 10, without sealing the conveyor frame. The sensor mouth and open path are placed in communication with the hollow interior 206 of the conveyor frame. In a second step, shown in FIG. 47, the vacuum tool 350 is mounted over the sensor 210, creating a seal. Then, air is evacuated from the frame interior 206, sensor 210 and vacuum tool 350 via vacuum port 354, creating a vacuum that inhibits the growth of pathogens and all living matter within the frame interior 206, and kills most living organisms within the interior. Next, as shown in FIG. 48, the wrench 360, or other suitable tool, engages the sensor housing 214 to seal the port 202 with the sensor 210 while maintaining the vacuum. The illustrative wrench 360 rotates within the chamber 356 to screw in the sensor, but any suitable means for sealing the port with the sensor may be used. Then, as shown in FIG. 49, the vacuum can be released and the vacuum tool 350 removed. The sensor 210 seals the port 202 to maintain the vacuum within the hollow interior 206 of the frame and also monitors the condition of the hollow interior to detect any breach in the vacuum.

In one embodiment, an indicator on the sensor can be used to signify the conditions in the conveyor frame interior. For example, the indicator can emit a yellow light during initiation of a kill cycle with the vacuum. The sensor can show a green light when the kill is complete, and the evacuated interior is sealed. A red light can indicate that the interior has been compromised.

The sensor 210 can utilize any suitable means for detecting and initiating an alert if the vacuum is compromised. For example, the sensor can be an active short-range sensor, emitting a signal that can be read on a nearby device, such as a blue tooth device. The sensor can be an active long-range sensor, emitting a signal that can be read in a control room of a plant where one or more conveyors are monitored. The sensor can be passive, using radio frequency identification (RFID) or other means that can be read by an active reader.

FIGS. 50-55 show another embodiment of a sensor 310 that can be used to seal and monitor a hollow interior of a conveyor frame. The sensor 310 comprises a housing 314 having a neck 316 having an open mouth 317 and an interior for receiving electronics 312 for sensing a condition, such as pressure. An electronics base plate 322 is also housed in the housing 314. The illustrative housing 314 is plastic, but the invention is not so limited. The housing 314 forms a flange 323 having openings 324 for receiving fasteners to mount the sensor 310 to a conveyor frame port in communication with a hollow frame interior. A lower O-ring 325 or other suitable seal seals the interface between the port and the housing 314. A lid 315 is coupled to the housing 314 to seal the electronics within the interior of the housing 314. The lid 315 may be plastic, or another material, and be welded or otherwise sealed to the housing 314. The lid includes an umbrella check valve 326 for applying a vacuum. A removable plug 318 is coupled to the lid to seal the sensor 310. The plug 318 can be removed to apply a vacuum to evacuate the sensor and a connected hollow frame interior.

FIGS. 56-60 show another embodiment of a sensor 410 that can be used to seal and monitor a hollow interior of a conveyor frame. The sensor 410 comprises a lower housing 414 having a threaded neck 416 in which electronics 412 for measuring pressure are mounted. A lid 415 is coupled to the lower housing 414 and includes a check valve 422 to allow application of a vacuum. An O-ring 425 seals the interface between the sensor and the associated port connecting to a hollow interior of a frame, and an outer cap 417 encapsulates the upper components of the sensor 410. The sensor 410 can be screwed into a threaded port of a conveyor frame designed to receive the sensor 410.

Figure 63:
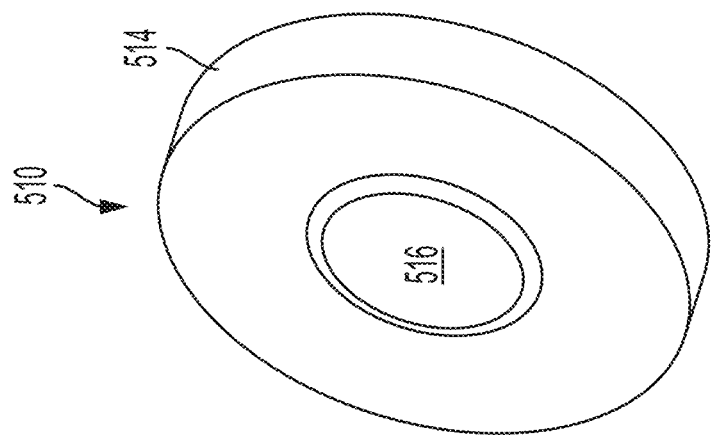
FIG. 63 is an isometric view of the sensor of FIG. 61.
Figure 62:
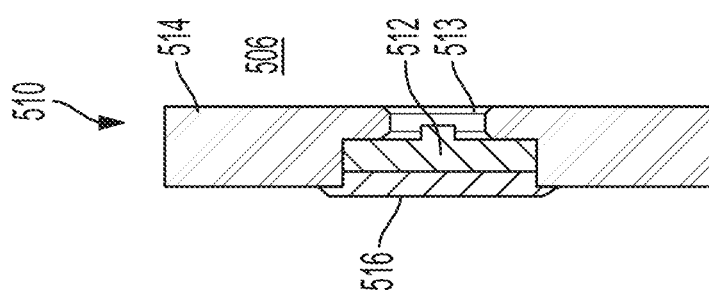
FIG. 62 is a cross-sectional view of the sensor of FIG. 61.
Figure 61:
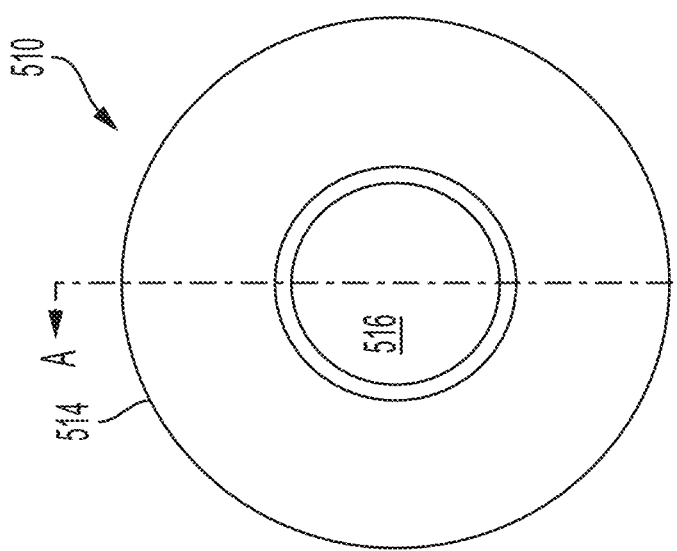
FIG. 61 is a top view of a sensor suitable for monitoring a hollow interior of a conveyor frame according to another embodiment of the invention.

Another embodiment of a sensor that can be used to monitor a hollow interior of a conveyor frame is shown in FIGS. 61-63. The sensor 510 comprises an RFID tag 512 embedded in an opening 513 in a conveyor frame rail 514 to an evacuated, hollow interior 506. The RFID tag 512 is open to the evacuated, hollow interior, with an antenna facing opposite. A potting 516 covers the RFID tag 512 to seal the sensor from the environment. The RFID tag can be read to determine the pressure within the interior of the conveyor and ensure that the vacuum seal has not been breached.

The sensor for monitoring the pressure within a vacuum sealed conveyor frame interior can comprise any suitable configuration, communication means, sensing means, mounting means and be inserted in any suitable port in the conveyor frame, not limited to the illustrative embodiments.

Although the invention has been described with reference to specific versions, other versions are possible. The scope of the invention is not meant to be limited to the exemplary versions described in detailed.

What is claimed is:

1. A scraper assembly for a conveyor belt comprising:
    a pair of opposing connecting plates for pivotally mounting the scraper assembly to mounting plates at an outfeed end of the conveyor belt;
    a scraper mounting bar extending between the pair of opposing connecting plates;
    a scraper blade mounted to the scraper mounting bar;
    a roller limiter extending between the pair of opposing connecting plates, the roller limiter including a first axle extending from a first end of the roller limiter and a second axle extending from a second end of the roller limiter; and
    a first leaf spring connected to and extending rearward from the mounting bar, the leaf spring configured to bias the scraper blade into contact with the conveyor belt.

2. The scraper assembly of claim 1, wherein each opposing connecting plate comprises an upper hook for connecting to a protrusion on a mounting plate, a curved neck portion and an elongated opening for receiving a cylindrical cap, each cylindrical cap housing a bearing for rotatably housing a roller limiter axle.

3. The scraper assembly of claim 2, wherein each opposing connecting plate further includes an outward-facing opening including top and bottom protrusions forming a narrowed mouth for mounting the scraper mounting bar.

4. The scraper assembly of claim 2, further comprising connecting arms for connecting each end of the scraper mounting bar to a cylindrical cap.

5. The scraper assembly of claim 1, wherein the scraper blade is mounted in scraper mounting taps that extend from the scraper mounting bar.

6. The scraper assembly of claim 1, wherein the leaf spring comprises an enlarged central portion with an opening for engaging a latch on a mounting plate.

7. A drive head for a positively driven conveyor belt, comprising:
    a pair of opposing mounting plates;
    a drive sprocket mounted between the mounting plates; and
    a position limiter-scraper assembly comprising a roller extending between two connecting plates mounted to the mounting plates, a scraper assembly having a scraper blade mounted to a mounting bar extending between the two connecting plates and a leaf spring extending rearward from the mounting bar for biasing the scraper blade into contact with the conveyor belt.

8. The drive head of claim 7, wherein the drive sprocket has a drive axis about which the drive sprocket rotates and the roller of the position limiter-scraper assembly has a roller axis about which the roller rotates, where the position limiter-scraper assembly is mounted to the mounting plate in a manner that the drive axis and the roller are substantially parallel and the center distance between the drive axis and the roller axis is limited and the scraper blade can pivot about the roller.

9. The drive head of claim 7, wherein each mounting plate includes a mounting protrusion and each connecting plate includes an upper hook for pivotably mounting the position limiter-scraper assembly to a corresponding mounting protrusion.

10. The drive head of claim 9, wherein the roller includes a first axle extending from a first end and a second axle extending from a second end.

11. The drive head of claim 10, wherein each connecting plate further comprises a curved neck portion forming a nook for a protruding axle of the drive sprocket and an elongated opening for receiving a cylindrical cap, each cylindrical cap housing a bearing for rotatably housing a roller axle.

12. The scraper drive head of claim 11, whrein each connecting plate further includes an outward-facing opening including top and bottom protrusions forming a narrowed mouth for mounting the mounting bar.

13. The drive head of claim 7, wherein a first mounting plate further includes a latch for latching the leaf spring in an engaged position.

14. A conveyor frame, comprising:
a support structure for a carryway, the support structure extending longitudinally from an infeed end to an outfeed end;
a carryway on top of the support structure, the carryway comprising a plurality of longitudinal sections extending from the infeed end to the outfeed end;
a set of infeed mounting plates at the infeed end;
a set of outfeed mounting plates at the outfeed end;
a drive mounted between the outfeed mounting plates; and
a position limiter-scraper assembly comprising a roller extending between two connecting plates mounted to the outfeed mounting plates, a scraper assembly having a scraper blade mounted to a mounting bar extending between the two connecting plates and a leaf spring extending rearward from the mounting bar for biasing the scraper blade into contact with the conveyor belt.

15. The conveyor frame of claim 14, wherein each connecting plate includes an upper hook for pivotably mounting the position limiter-scraper assembly to a corresponding protrusion on a corresponding outfeed mounting plate, a curved neck portion forming a nook for a protruding axle of the drive and an elongated opening for receiving a cylindrical cap, each cylindrical cap housing a bearing for rotatably housing an axle extending from an end of the roller.

16. The conveyor frame of claim 15, wherein each connecting plate further includes an outward-facing opening including top and bottom protrusions forming a narrowed mouth for mounting the scraper mounting bar.

17. The conveyor frame of claim 14, wherein a first mounting plate further includes a latch for latching the leaf spring in an engaged position.

18. The conveyor frame of claim 14, further comprising a carryway and belt lifter mounted to the outfeed mounting plates for selectively raising the carryway above the support structure and raising a conveyor belt above the carryway in a cleaning mode.

19. The conveyor frame of claim 18, wherein the outfeed mounting plates each include an opening for receiving a lateral rail of the carryway and belt lifter.

* * * * *